(12) United States Patent
Jung et al.

(10) Patent No.: US 11,513,690 B2
(45) Date of Patent: Nov. 29, 2022

(54) MULTI-DIMENSIONAL I/O SERVICE LEVELS

(71) Applicant: EMC IP Holding Company LLC, Hopkinton, MA (US)

(72) Inventors: Jaeyoo Jung, Shrewsbury, MA (US); Narasimha R. Challa, Hudson, MA (US); Benjamin A. Randolph, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 16/925,629

(22) Filed: Jul. 10, 2020

(65) Prior Publication Data
US 2022/0011942 A1 Jan. 13, 2022

(51) Int. Cl.
*G06F 12/00* (2006.01)
*G06F 3/06* (2006.01)

(52) U.S. Cl.
CPC ............ *G06F 3/0611* (2013.01); *G06F 3/067* (2013.01); *G06F 3/0635* (2013.01); *G06F 3/0644* (2013.01); *G06F 3/0653* (2013.01); *G06F 3/0659* (2013.01)

(58) Field of Classification Search
CPC .... G06F 3/0611; G06F 3/0635; G06F 3/0644; G06F 3/0653; G06F 3/0659; G06F 3/067; G06F 2212/1041
See application file for complete search history.

(56) References Cited

U.S. PATENT DOCUMENTS

| | | | |
|---|---|---|---|
| 7,945,640 B1 * | 5/2011 | VanTine | G06F 3/067 709/217 |
| 9,223,613 B2 * | 12/2015 | Mathur | G06F 11/3485 |
| 9,495,112 B1 * | 11/2016 | Braun | G06F 3/0644 |
| 9,558,232 B1 * | 1/2017 | Taylor | G06F 3/0659 |
| 10,146,446 B1 * | 12/2018 | Anchi | G06F 3/0613 |
| 10,613,998 B2 | 4/2020 | Jung et al. | |
| 2011/0231541 A1 * | 9/2011 | Murthy | H04L 63/10 709/224 |
| 2013/0159637 A1 * | 6/2013 | Forgette | G06F 3/067 711/E12.001 |

(Continued)

OTHER PUBLICATIONS

Nvm Express, NVM Express over Fabrics, Revision 1.1, Oct. 22, 2019.

*Primary Examiner* — David Yi
*Assistant Examiner* — Tahilba O Puche
(74) *Attorney, Agent, or Firm* — Muirhead and Saturnelli, LLC

(57) ABSTRACT

Techniques for determining service levels may include receiving an I/O operation at a target port of a data storage system, where the I/O operation is sent from an initiator port of a host and directed to a storage object in a first storage group. The initiator port may be included in a first initiator group and the target port may be included in a first port group. The I/O operation may be assigned a service level using a table of a service levels specified for different triples. Each triple may identify an initiator groups, a storage group and a port group. Assigning the service level may include determining a first of the triples that matches the first storage group, the first initiator group and the first port group, wherein the first triple is associated with the service level.

23 Claims, 13 Drawing Sheets

(56) References Cited

U.S. PATENT DOCUMENTS

| | | | |
|---|---|---|---|
| 2015/0186226 A1* | 7/2015 | Oppermann | G06F 11/2087 |
| | | | 714/6.23 |
| 2016/0275085 A1* | 9/2016 | Soundararajan | G06F 16/122 |
| 2017/0103223 A1* | 4/2017 | Deulgaonkar | G06F 3/062 |
| 2018/0123911 A1* | 5/2018 | Zhang | H04L 41/5009 |
| 2020/0382387 A1* | 12/2020 | Pasupathy | H04L 47/2425 |

* cited by examiner

MULTI-DIMENSIONAL I/O SERVICE LEVELS

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, a host may perform I/O operations such as data read and write operations sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the I/O operations to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Various embodiments of the techniques herein may include a method, a system and a computer readable medium for determining service levels comprising: receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes: determining a first triple of the plurality of triples that matches the first storage group, the first initiator group and the first port group, wherein the first triple is associated with the first service level.

In at least one embodiment, processing may include determining that service levels are assigned to I/O operations based on initiator group service levels (IGSLs); responsive to determining that service levels are assigned to I/O operations based on the IGSLs, performing first processing that creates the table of the plurality of service levels based on IGSLs, the first processing including: specifying a plurality of IGSLs for the plurality of initiator groups, wherein each of the plurality of IGSLs identifies a target I/O response time range for one of the plurality of initiator groups; and for each of the plurality of initiator groups having an associated one of the plurality of IGSLs, performing second processing that creates a hierarchy including three levels of nodes, said each initiator group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of storage groups, wherein a path from the root node to a second node in the third level denotes one of the plurality of triples having an associated service level and an associated target I/O response time range corresponding to the second node in the third level.

In at least one embodiment, the second processing may include: partitioning the target I/O response time range of the associated one of the plurality of IGSLs for said each initiator group into a plurality of subranges; specifying a plurality of port group service levels (PGSLs) for the plurality of port groups, wherein each of the plurality of subranges is assigned to a different one of the PGSLs for one of the plurality of port groups represented by one of the nodes of the second level of the hierarchy; for each of the plurality of port groups having an associated one of the plurality of PGSLs, partitioning one of the plurality of subranges that is assigned to the associated one of the plurality of PGSLs into a second plurality of subranges; and specifying a plurality of storage group service levels (SGSLs) for the plurality of storage groups, wherein each of the second plurality of subranges is assigned to a different one of the SGSLs for one of the plurality of storage groups represented by one node of the third level in the hierarchy. The subranges of the plurality may not overlap one another and each of the plurality of subranges may be the same size. The subranges of the second plurality may also not overlap one another and each of the second plurality of subranges may be the same size.

In at least one embodiment, each of the plurality of triples may represent a path or connection between an initiator port of the one initiator group and a target port of the one port group, and wherein one or more storage objects of the one storage group may be accessible for I/O operations over the path or connection. The plurality of initiator groups may include a plurality of initiator ports of a plurality of hosts.

In at least one embodiment, processing may include: determining to assign service levels to I/O operations based on storage group service levels (SGSLs); and responsive to determining to assign service levels based on the SGSLs, performing first processing that creates the table of the plurality of service levels based on SGSLs, the first processing including: specifying a plurality of SGSLs for the plurality of storage groups, wherein each of the plurality of SGSLs identifies a target I/O response time range for one of the plurality of storage groups; and for each of the plurality of storage groups having an associated one of the plurality of SGSLs, performing second processing that creates a hierarchy including three levels of nodes, said each storage group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of initiator groups, wherein a path from the root node to a second node in the third level denotes one of the plurality of triples having an associated service level and an associated target I/O response time range corresponding to the second node in the third level.

In at least one embodiment, the second processing may include: partitioning the target I/O response time range of the associated one of the plurality of SGSLs for said each storage group into a plurality of subranges; specifying a plurality of port group service levels (PGSLs) for the plurality of port groups, wherein each of the plurality of subranges is assigned to a different one of the PGSLs for one of the plurality of port groups represented by one of the nodes of the second level of the hierarchy; for each of the plurality of port groups having an associated one of the plurality of PGSLs, partitioning one of the plurality of subranges that is assigned to the associated one of the plurality of PGSLs into a second plurality of subranges; and specifying a plurality of initiator group service levels (IGSLs) for the plurality of initiator groups, wherein each of the second plurality of subranges is assigned to a different one of the IGSLs for one of the plurality of initiator groups represented by a node of the third level in the hierarchy. The subranges of the plurality may not overlap one another and each of the subranges may be the same size. The subranges of the second plurality may also not overlap one another and each of the subranges of the second plurality may be the same size.

In at least one embodiment, the target I/O response time ranges of the IGSLs may form a contiguous non-overlapping I/O response time range. Processing may include: receiving an input that indicates whether to assign service levels to I/O operations based on initiator group service levels (IGSLs) or based on storage group service levels (SGSLs); responsive to the input indicating to assign service levels to I/O operations based on IGSLs, generating the table using a top down approach in which IGSLs are specified and used to determine port group service levels (PGSLs) for the plurality of port groups within each of the IGSLs, and wherein each of the PGSLs for one of the plurality of port groups is used to determine SGSLs for the plurality of storage groups within each of the PGSLs, and wherein each of the SGSLs denotes one of the plurality of service levels associated with one of the plurality of triples; and responsive to the input indicating to assign service levels to I/O operations based on SGSLs, generating the table using a bottom up approach in which SGSLs are specified and used to determine PGSLs for the plurality of port groups within each of the SGSLs, and wherein each of the PGSLs for one of the plurality of port groups is used to determine IGSLs for the plurality of initiator groups within each of the PGSLs, and wherein each of the IGSLs denotes one of the plurality of service levels associated with one of the plurality of triples.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
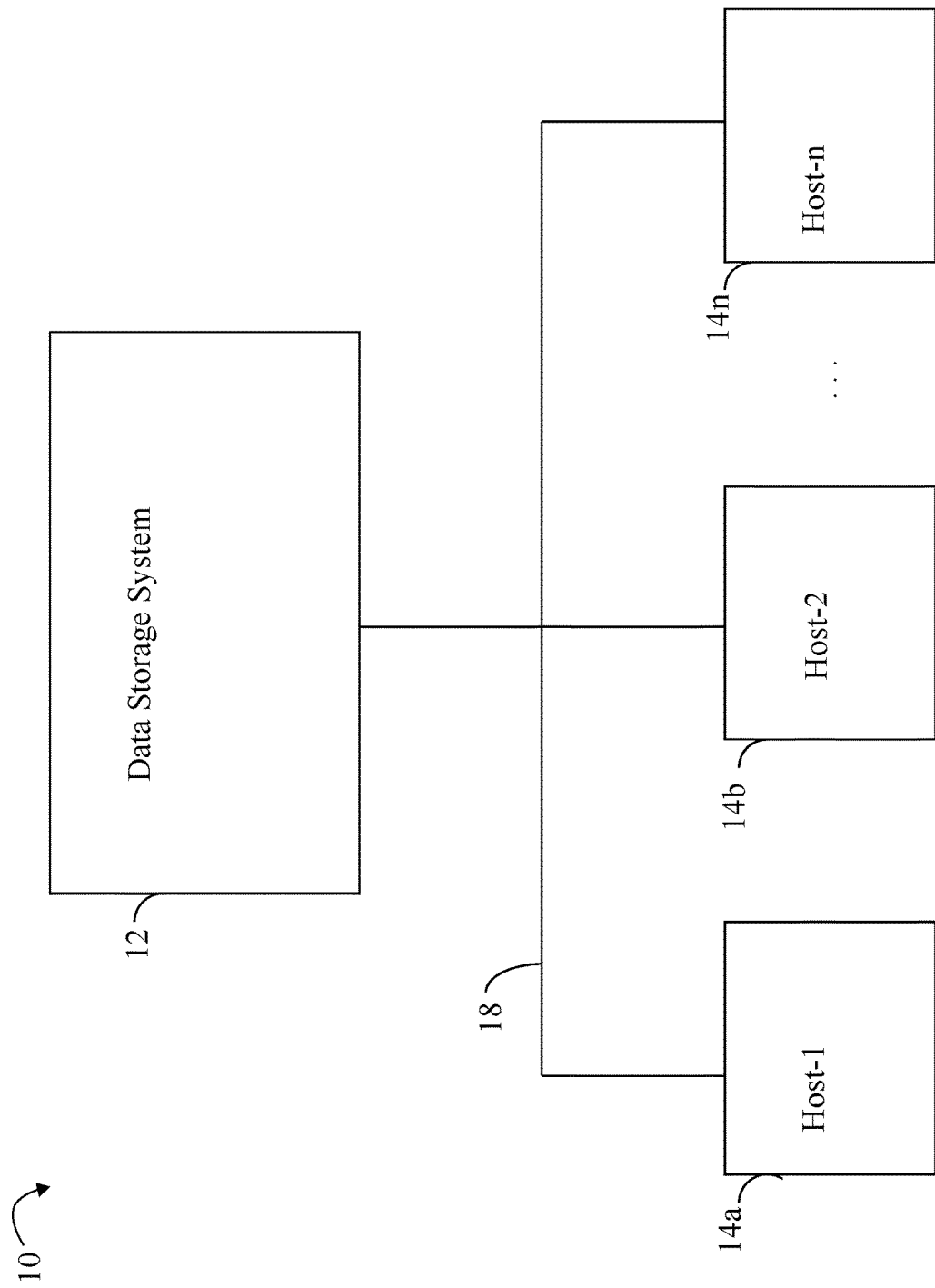
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system 12 may all be located at the same physical site, or, alternatively, may also be located in different physical locations. The communication medium 18 that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMeoF (Non-Volatile Memory Express over Fabrics) TCP, Infiniband (IB), and the like. Some or all of the connections by which the hosts and the data storage system 12 may be connected to the communication medium 18 may pass through other communication devices as well as other switching equipment that may exist such as a phone line, a repeater, a multiplexer or even a satellite.

Each of the host computer systems may include one or more applications that perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
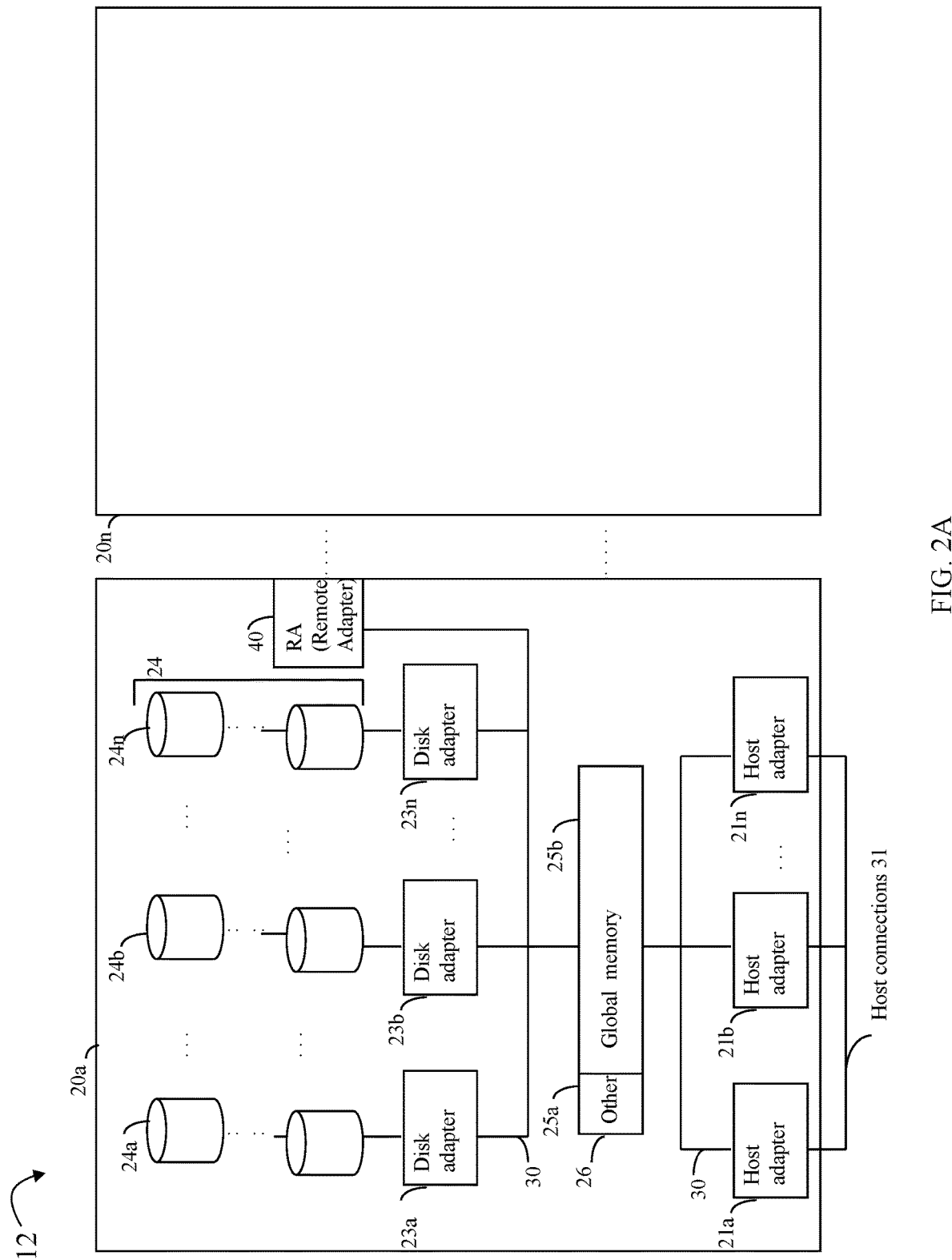
FIG. 2A is an example of an embodiment of a data storage system

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, the physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, the directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. DAs may be characterized as backend components of the data storage system. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units of storage. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers, for example, in connection with the SCSI standard. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

As noted above, the DAs of the data storage system may be characterized as backend components of the data storage systems. The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
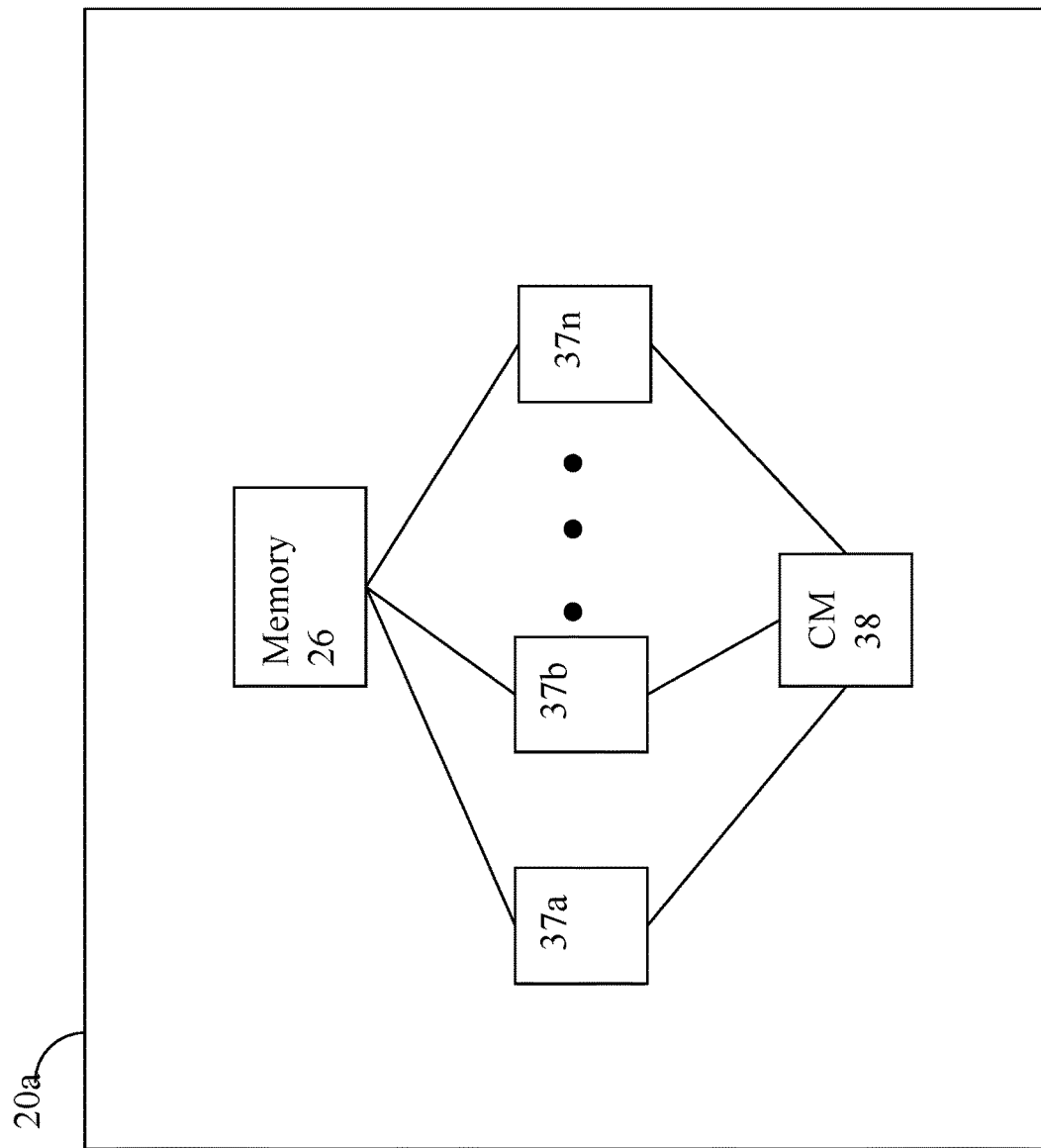
FIG. 2B is a representation of the logical internal communications between the directors and memory included in one embodiment of data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device, volume or other logical storage unit such as denoted by a LUN or other storage entity that may vary with the system and protocol. For example, in the NVMe protocol, a namespace may denote a logical storage unit, volume or device. Thus, although discussion herein may sometimes refer to a LUN, more generally, use of such the term LUN may more generally denote a logical storage unit volume or device that may have a different corresponding term for the storage entity, such as a namespace, in another protocol, such as NVMe. In discussion herein where a LUN may generally denote a logical device or unit of storage on the data storage system, the same logical device or unit of storage may have different identifiers used in different contexts and protocols. For example, a logical device configured on the data storage system may be exposed as a LUN to the host over a first path using the SCSI protocol. The LUN on the first path may be associated with an identifier, such as a world wide unique name (WWN) used in connection with the SCSI protocol of the first path. The same logical device may be exposed as a namespace to the host over a second path using the NVMe protocol. The LUN on the second path may be associated with a different identifier, such as a namespace globally unique identifier (NSID), used in connection with the NVMe protocol of the second path. As known in the art, a namespace in the NVMe protocol is storage formatted for block access and is analogous to a logical device or LUN in SCSI.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
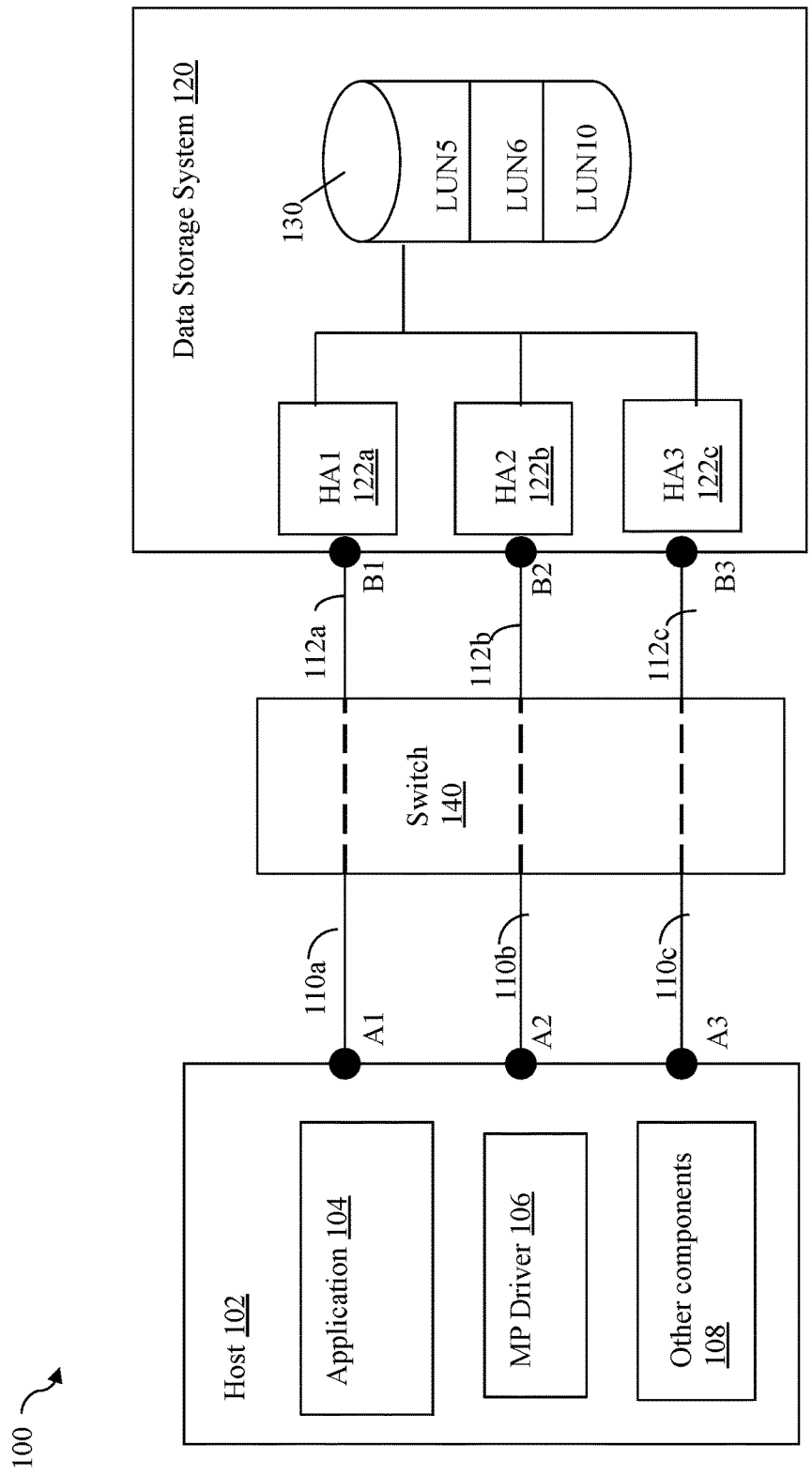
FIG. 3 is an example of systems and components that may be used in connection with the techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure.

The MP driver 106 may be included in a commercially available product such as, for example, Dell® EMC PowerPath® software. The host 102 may also include other components 108 such as one or more other layers of software used in connection with communicating the I/O operation from the host to the data storage system 120. For example, element 108 may include Fibre Channel (FC), TCP, SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
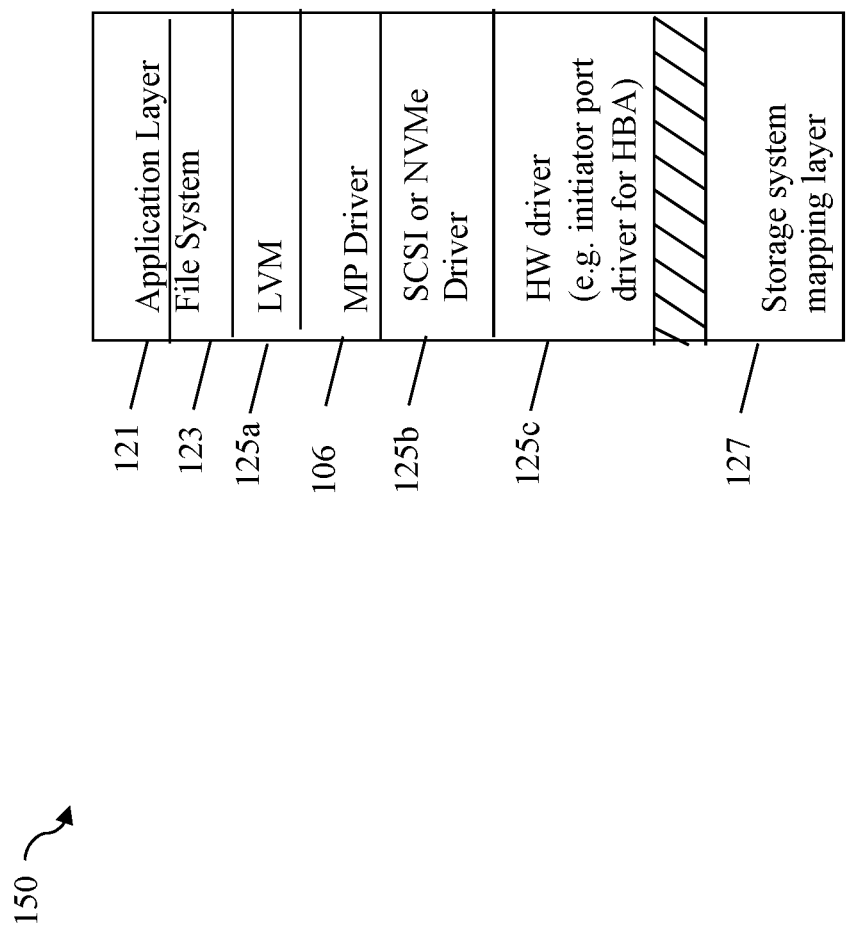
FIG. 4 is an example of different software layers that may be included in a host and a data storage system in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ over Fabrics, Revision 1.1, Oct. 22, 2019, available at https://nvmexpress.org/developers/nvme-of-specification/ and the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or a write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment using an NVMe protocol, such as NVMeoF TCP known in the art and described elsewhere herein, each path or physical link may generally include one or more logical connections, streams or queues. In contrast, the SCSI standard is an example of a protocol that may be characterized as using only a single logical connection per specified path or physical link between a host port and a data storage system port over which LUNs (e.g., logical storage device or units referred to in terms of the NVMe standard as namespaces) are exposed or visible for I/O operations. Generally, the single logical connection may denote a single logical stream or queue of I/Os that may be issued sequentially over the single logical connection.

The techniques herein may be used with a protocol such as SCSI and may also be used with a protocol such as NVMe in which there are multiple logical connections, streams or queues per specified path or physical link. For example, an embodiment may use the NVMeoF TCP protocol to define and use multiple logical connections in a single path or physical link. In such an embodiment, the multiple logical connections may be implemented using multiple logical entities operating over the same path or physical link. In at least one embodiment using NVMe, the HBA on the host may implement multiple dynamic controllers as the host side logical entities of the multiple logical connections of the same path. The host side logical entities have a corresponding data storage system side logical entity forming the multiple logical connections, queues or streams. A single logical connection may be between one of the host side logical entities and a corresponding one of the data storage system side logical entities. The logical connections on the same path of physical link may share resources of the same path or physical link. The multiple logical connections operating on the same path or physical link may operate in parallel. Each of the logical connections may operate independently of the other remaining logical connections. I/Os may be sent in parallel over the multiple logical connections on the same path or physical link at the same time.

Figure 5A:
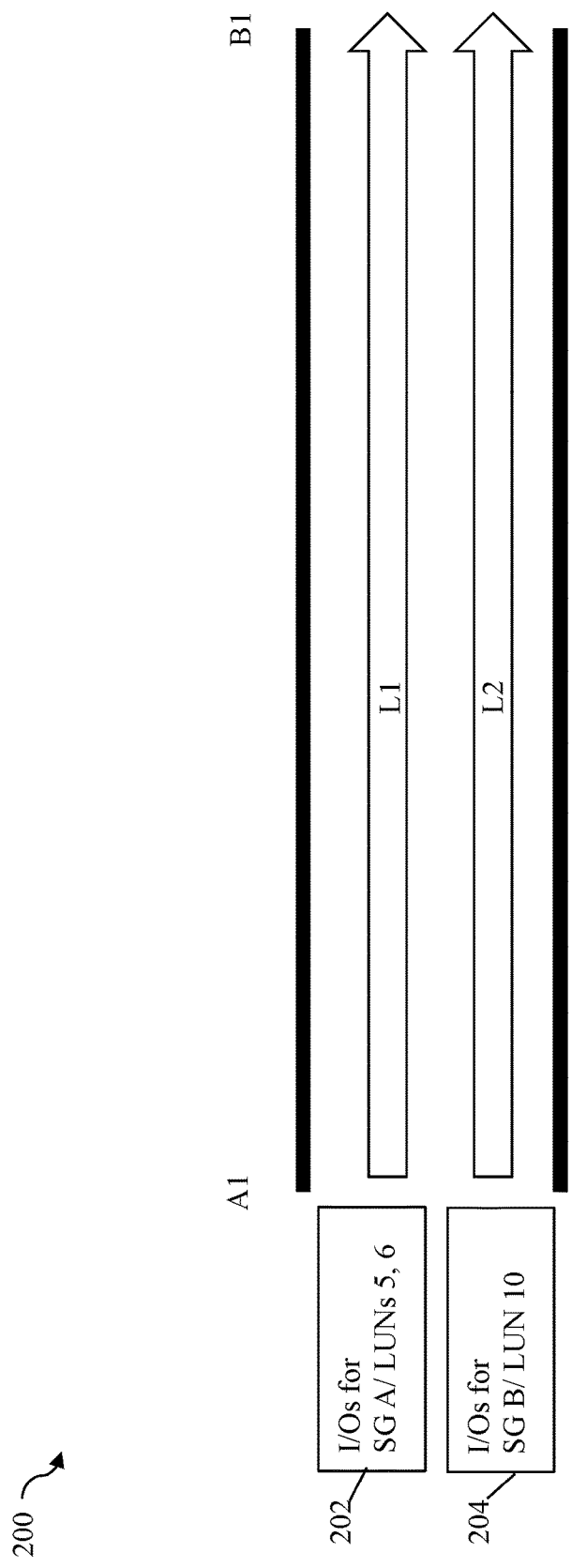
FIG. 5A is an example illustrating a path with multiple logical connections, streams or queues of I/Os as may be used with the NVMe (Non-Volatile Memory express) protocol in an embodiment in accordance with the techniques herein.

Referring to FIG. 5A, shown is an example illustrating multiple logical connections over a single path or physical link in an embodiment in accordance with the techniques herein. In connection with FIG. 5A, assume there is a logically defined storage group SG A including LUNs 5 and 6 and also a defined storage group SG B including LUN 10. In this example, the LUNs 5 and 6 of SG A and the LUN 10 of SG B may all be exposed over the same single path or connection A1-B1 between the host and the data storage system. However, as noted below, different logical connections may be used for servicing I/Os of SG A and SG B.

The example 200 illustrates the single path or physical link A1-B1 as described in connection with FIG. 3. The example 200 illustrates an embodiment in which 2 logical connections, streams or queues of I/Os may be configured for the single path or physical link A1-B1. In this example, L1 may denote one of the logical connections used to send I/Os 202 directed to LUNs 5 and 6 of SG A. L2 may denote a second of the logical connections used to send I/Os 204 directed to the LUN 10 of SG B. It should be noted that although only 2 logical connections are illustrated for the single path, an embodiment may include any suitable number of logical connections configured for the single path. The number of logical connections allowable for configuration over the single path may vary with embodiment. In one aspect, the number of logical connections allowable may depend on the particular protocol or standards, vendor implementation, and the like.

FIG. 5A illustrates one configuration of the same path or physical link including multiple logical connections such as in connection with the NVMe protocol and standard.

In FIG. 5A using the NVMe protocol, each path or link from an initiator, such as A1 denoting a host port, to a target, such as T1 denoting a data storage system port, may be based on identifiers in the NVMe protocol. For example, in accordance with the NVMe protocol, the initiator A1 of a connection, path or link may be identified by the combination of a host NQN (NVMe Qualified Name) and a host ID (identifier); and the target T1 of the connection, path or link may be identified by a combination of a controller ID and subsystem NQM.

Figure 5B:
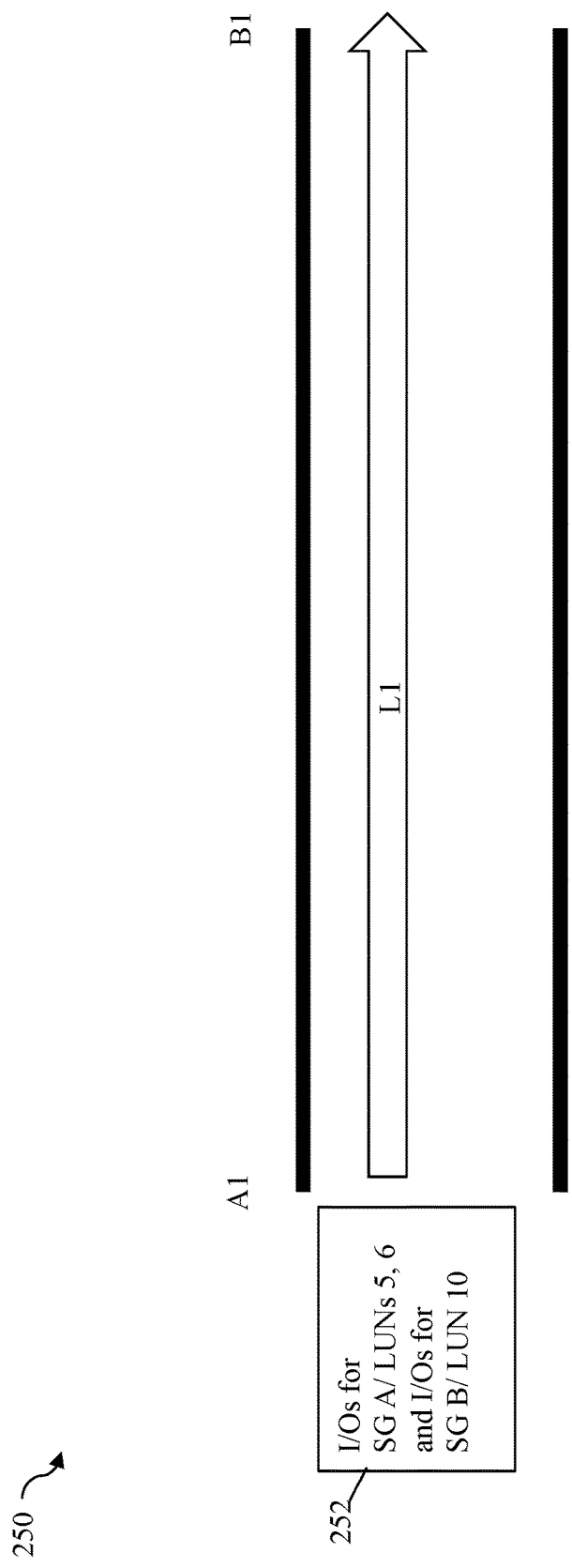
FIG. 5B is an example illustrating a path with a single logical connection, stream or queue of I/Os as may be used with the SCSI (Small Computer System Interface) protocol in an embodiment in accordance with the techniques herein.

In contrast to FIG. 5A, reference is made to FIG. 5B illustrating use of the same path or physical link A1-B1 but where the path is a SCSI path rather than an NVMe path as illustrated in FIG. 5A. In the FIG. 5B, assume that the LUNs 5 and 6 of SG A and the LUN 10 of SG B are exposed over the path A1-B1. In the example 250, there is only a single logical connection, stream or queue used to send I/Os directed to the LUNs 5, 6, and 10. The element 252 denotes the single aggregated stream or queue used to sequentially send I/Os directed to LUNs 5, 6 and 10 from the host to the data storage system.

In FIG. 5B using the SCSI protocol, each path or link from an initiator, such as A1 denoting a host port, to a target, such as T1 denoting a data storage system port, may be based on identifiers in the SCSI protocol. For example, in accordance with the SCSI protocol, the initiator A1 and the target T1 of a connection, path or link may be identified by their respective WWNs (world wide names).

More generally, the initiator and target of a path or link may be identified using one one or more entities that may vary with the particular protocol and standard used in an embodiment.

An embodiment in accordance with the techniques herein may define multiple service levels or SLs denoting different performance targets or goals for I/O operations received at the data storage system. The data storage system may provide a multi-tenant (MT) environment whereby multiple tenants or clients, such as applications, store their data on the data storage system. In such an environment, a different service level or SL may be specified for different data sets or storage objects that defines a target performance level for the particular data set or storage object used by the application. For example, an SL may be related to a target level of performance or service with respect to I/O operations serviced at the data storage system. The SL specified may be expressed in terms of one or more metrics, such as based on I/O RT, target I/O throughput (e.g., I/O rate such as I/Os per second), data throughput (e.g., megabytes per second), and the like. For example, the SL specified may include an average RT with respect to I/Os issued to a particular logical defined data set. To further illustrate, an SL may specify an average RT of 3 milliseconds (ms.) for a particular data set whereby the target or goal for the data set is to have an observed or measured average I/O RT of 3 ms (milliseconds) for the data set, or more generally, for each storage object in the data set. In some systems, the SL may denote a target RT range that is a contiguous range of RT values. The client, such as an application, may also be referred to as a consumer of the data storage system (and data storage system resources) where the consumer's data is stored on the data storage system. A single client or consumer may be, for example, an application executing on a host. A single host may have one or more applications.

In some existing data storage systems, an SL may be specified for each logical group of one or more LUNs, such for an SG of LUNs, NSIDs or other storage objects. More generally, as noted above, an SL may be specified for a logical grouping of data storage objects. Generally, the SL for an SG may be characterized as the performance target or goal performance for the SG. The data storage system may perform processing to control, achieve or regulate I/Os and resources utilized for processing such I/Os in order to maintain the goals or targets of the SL. An SL violation may occur, for example, when an observed I/O RT for an SG or its storage objects does not meet the I/O RT specified by the SL for the SG. An SL violation may occur if the measured or observed I/O RT performance for the SG is above or below the target SL performance. Responsive to such an SL violation not meeting the target performance goal of the SL, remediation processing may be performed to attempt to alleviate, and, if possible, eliminate, the SL violation. An SL may be assigned to each defined logical SG of one or more LUNs, NSIDS or other storage objects, as noted above, where an I/O directed to any storage object of the SG has the same SL (as specified for the SG).

In existing systems, for a storage object belonging to an SG having an associated SL, an I/O directed to the storage object may be assigned a target RT, and thus prioritized for servicing, based on the SL associated with the SG. However, it may be desirable to provide for a finer granularity of SL control based on entities other than just SGs.

Described herein are techniques that provide for multidimensional I/O SLs in a system. Systems and networks may have configurable entities that include groups of data storage system ports and groups of host ports as well as SGs. In at least one embodiment, I/O control may be provided at three layers of the I/O path based on initiator group (IG), port group (PG), and SG. An IG may be a logically defined grouping of one or more initiator or host ports. A PG may be a logically defined grouping of one or more data storage system ports or target ports. An embodiment may define one or more IGs, one or SGs, and one or more PGs.

Generally, the IGs may include initiator ports of one or more hosts. In some embodiments, the IGs may include initiator ports of multiple hosts. For example, IG1 and IG2 may denote initiator ports of a first host and IG3 and IG4 may denote initiator ports of a second different host.

Multiple predefined SLs may be specified. In at least one embodiment, multiple SLs may be defined each specifying different target performance objectives such as with respect to I/Os. For example, an embodiment may include the following service levels, from highest service and performance level to lowest service and performance level: Diamond, Platinum, Gold, Silver, and Bronze. An embodiment may include service levels different from those described herein. Each service level may have an associated target response time (RT) range where, for example, Diamond has the highest performance goals and thus the lowest target RT range of all the service levels. In contrast to Diamond, Bronze may have the lowest performance goals and thus the highest target RT range of all the service levels listed. It should be noted that other embodiments may have additional and/or different service levels than as noted above and used elsewhere herein for purposes of illustration.

An embodiment may have any suitable number of SLs defined for each of the different layers or levels of entities, where the different layers of entities include IGs, PGs and SGs. In at least one embodiment, an SL structure or hierarchy used with the techniques herein may include 3 levels of entities, where the 3 levels includes an IG level of IGs, a PG level of PGs, and a SG level of SGs. In some embodiments, the number of SLs, and thus configurable entities, of each layer or level may be the same.

In at least one embodiment, the customer may select to either use a top down multi-dimensional service level (TDMDSL) approach (also sometimes referred to as a top down or IG-based approach) or a bottom up multi-dimensional service level (BUMDSL) approach (also sometimes referred to as a bottom up or SG-based approach). Both approaches provide for configuring latency or SL goals for the different IG, PG, and SG configurable entities in the system. The TDMDSL approach provides for configuring latency or SL goals starting with the IGs. With TDMDSL, the customer specifies different target latency goals for the SLs of the IGs. Subsequently, the various PGs and SGs are then assigned different target latency goals in accordance with those specified for the higher priority IGs. The TDMDSL approach in at least one embodiment may use an SL structure or hierarchy that includes a first level of one or more IGs, a second level of one or more PGs and a third leaf level that includes one or more SGs. In contrast to TDMDSL, the BUMDSL approach provides for configuring latency or SL goals starting with the SGs. With BUMDSL the customer specifies different target latency goals for the SLs of the SGs. Subsequently, the various PGs and IGs are then assigned different target latency goals in accordance with those specified for the higher priority SGs. The BUMDSL approach in at least one embodiment may use an SL structure or hierarchy that includes a first level of one or more SGs, a second level of one or more PGs and a third leaf level that includes one or more IGs.

In at least one embodiment, the particular SL structure or hierarchy constructed using either the top down or bottom up approach may be used to determine SLs for I/Os received at the data storage system. In one embodiment, a triple may be specified for each path in the hierarchy from a node of the first level to a leaf node in the third or leaf level. For example, the TDMSDL approach may use an SL structure where the first level includes IG nodes representing the IGs, the second level includes PG nodes representing PGs and the third or leaf level includes SG nodes representing SGs. In this case, a triple may be specified for each path in the SL structure, where each such path and triple includes 3 nodes—one of the IG nodes, one of the PG nodes and one of the SG nodes. Each IG node at the first level is a parent node having one or more child PG nodes of the second level. Each PG node of the second level is also a parent node having one or more child SG nodes that are also leaf nodes of the top down approach SL hierarchy. Connections between nodes of the SL hierarchy may be used to denote such parent child relationships between different levels. An SL target or goal may be specified for each of the triples determined for paths of the top down SL hierarchy. The SL target or goal for a triple may the particular SL associated with the leaf or third level node of the path. The SL target or goal of the triple may be assigned to each I/O transmitted from an initiator port included in the IG of the triple to a target portion of the data storage system included in the PG of the triple, and where the I/O is also directed to a storage object included in the SG of the triple. In this manner for the SL hierarchy for the top down approach, each path of the SL hierarchy and its associated triple may correspond to, and represent, a path from an IG to a PG over which an SG is exposed or available for I/O operations. Thus, the triples generated from the SL hierarchy for the top down approach may be used to assign an SL to each I/O received at the data storage system.

In at least one embodiment, the BUMSDL approach may use an SL structure where the first level includes SG nodes representing the SGs, the second level includes PG nodes representing PGs and the third or leaf level includes IG nodes representing IGs. In this case, a triple may be specified for each path in the SL structure for the bottom up approach, where each such path and triple includes 3 nodes—one of the SG nodes, one of the PG nodes and one of the IG nodes. Each SG node at the first level is a parent node having one or more child PG nodes of the second level. Each PG node of the second level is also a parent node having one or more child IG nodes that are also leaf nodes of the bottom up approach SL hierarchy. Connections between nodes of the SL hierarchy may be used to denote such parent child relationships between different levels. An SL target or goal may be specified for each of the triples determined for paths of the bottom up SL hierarchy. The SL target or goal for a triple may the particular SL associated with the leaf or third level node of the path. The SL target or goal of the triple may be assigned to each I/O transmitted from an initiator port included in the IG of the triple to a target portion of the data storage system included in the PG of the triple, and where the I/O is also directed to a storage object included in the SG of the triple. In this manner for the SL hierarchy for the bottom up approach, each path of the SL hierarchy and its associated triple may correspond to, and represent, a path from an IG to a PG over which an SG is exposed or available for I/O operations. Thus, the triples generated from the SL hierarchy for the bottom up approach may be used to assign an SL to each I/O received at the data storage system.

In at least one embodiment, the techniques herein may be performed in accordance with the NVMeoF TCP protocol. More generally, any suitable protocol may be used in an embodiment.

The foregoing and other aspects of the techniques herein are described in more detail in the following paragraphs.

In examples described below, 5 different SLs may be specified for each type of configurable entities. The different types of configurable entities may refer to the 3 types of groups including IGs, PGs and SGs. The 5 SLs of diamond, platinum, gold, silver and bronze as noted elsewhere herein may be specified for each such type of group. Thus each type of group includes 5 entities of the particular type (e.g., 5 SGs, 5 IGs and 5 PGs). However, more generally, the techniques herein have broader applicability and are not limited by the particular number of SLs, IGs, PGs, and SGs, as well as other details, provided in the following paragraphs to illustrate the techniques herein.

In at least one embodiment, a relative priority of the different entities of each type may be specified. For example, a customer may specify a first relative priority or ranking of the 5 IGs, a second relative priority or ranking of the 5 PGs, and a third relative priority or ranking of the 5 SGs. For simplification of illustration in this example, assume there are 5 IGs denoted as IG1, IG2, IG3, IG4 and IG5, wherein IGn has a higher priority than IG n+1; 5 PGs denoted as PG1, PG2, PG3, PG4 and PG5, wherein PGn has a higher priority than PG n+1; and 5 SGs denoted as SG1, SG2, SG3, SG4 and SG5, wherein SGn has a higher priority than SG n+1. More generally, the entities of each type may have any relative ranking depending the particular group or type instances. For example, IG1, IG2 and IG3 may denote IGs of a first host and IG4 and IG5 may denote IGs of a second different host. In this case, all IGs of the first host are ranked as having a higher priority than all IGs of the second host.

The 5 entities of each type may be assigned one of the 5 SL designations based on the relative priority or ranking of the particular type. In this example, the following are the associated SL designations for the IGs: IG1=diamond, IG2=platinum, IG3=gold, IG4=silver, and IG5=bronze; the following are the associated SL designations for the PGs: PG1=diamond, PG 2=platinum, PG 3=gold, PG 4=silver, and PG 5=bronze; and the following are the associated SL designations for the SGs: SG1=diamond, SG2=platinum, SG 3=gold, SG 4=silver, and SG 5=bronze.

Figure 6:
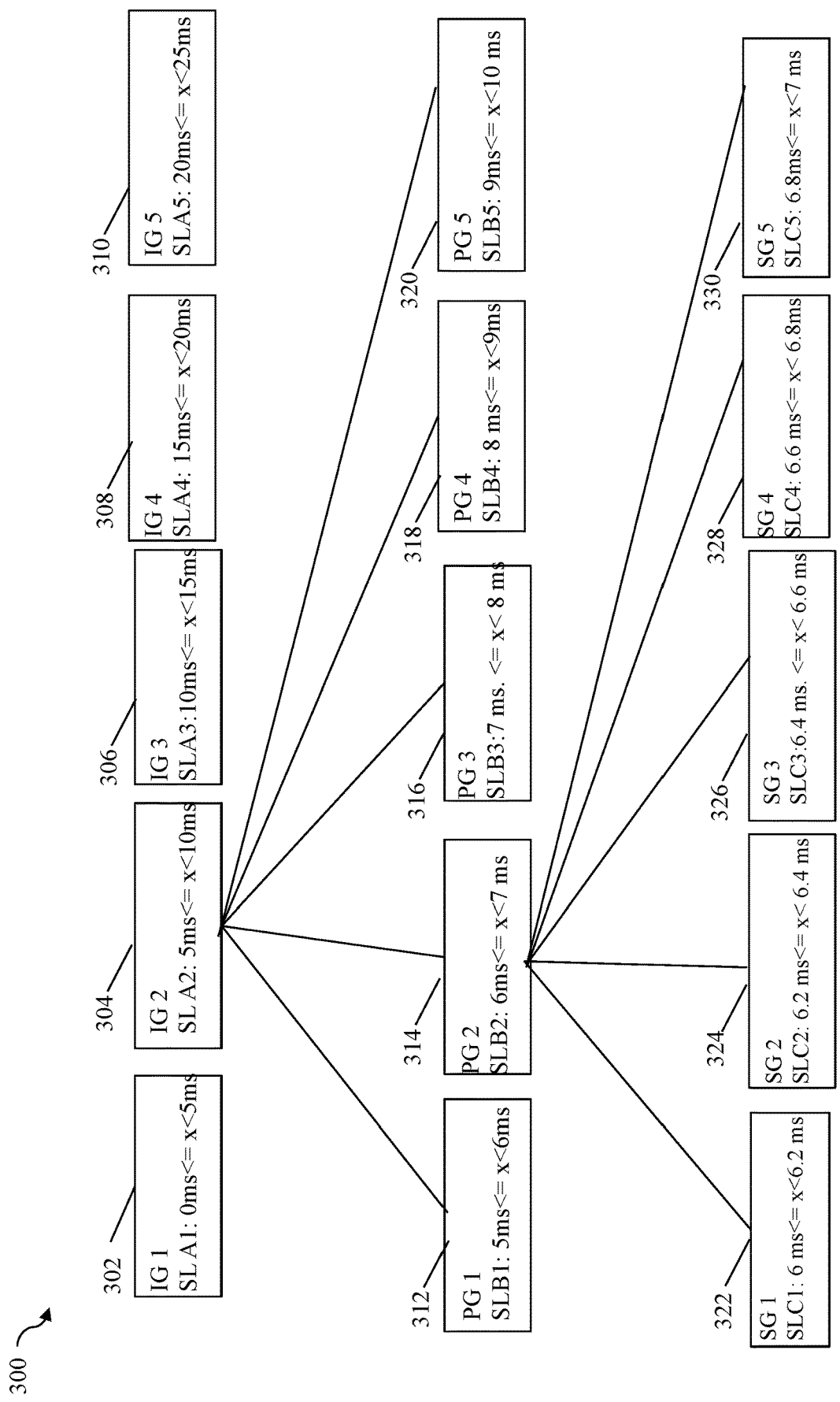
FIGS. 6, 8 and 10 are examples of service level hierarchies that may be generated and used in an embodiment in accordance with the techniques herein.

What will now be described with reference to FIG. 6 is how to determine SLs for I/Os using the top down or IG-based approach where I/O traffic is prioritized based on IGs. As described elsewhere herein, a configurable option or input, such as from a customer or user may be provided that indicates a selection to proceed with either the top down or IG-based approach where I/O traffic is prioritized based on IGs, or whether to proceed with the bottom up of SG-based approach where I/O traffic is prioritized based on SGs. In connection with FIG. 6, processing is described in the following paragraphs for determining SLs for I/Os using the top down or IG-based approach where I/O traffic is prioritized based on IGs.

Referring to FIG. 6, shown is an example 300 illustrating nodes of the SL hierarchy or structure that may be used in an embodiment in accordance with the techniques herein with the top down or IG-based approach where I/O traffic is prioritized based on IGs. The example 300 includes nodes 302, 304, 306, 308 and 310 of a first level in the hierarchy. Each of the nodes in the first level represent a different one of the 5 IGs.

As a first step S1, a target I/O range or latency may be specified for each of the IG nodes in the first level of the hierarchy 300. In at least one embodiment, the overall aggregate of the target ranges specified for the IG nodes 302, 304, 306, 308 and 310 may form a contiguous range of I/O RTs when the target ranges of the IG nodes are arranged sequentially in order based on their relative priority. In the example 300, the overall target range denoted by the IG nodes 302, 304, 306, 308 and 310 includes all RTs "x" that are greater than 0 and less than 25 (e.g., all the values x, where 0 ms.<=x<25 ms.) The overall target range of I/O RTs may be partitioned into smaller target ranges associated with the IG nodes 302, 304, 306, 308 and 310. In this example 300, the overall target range may be partitioned into 5 equal partitions or target ranges associated with the IG nodes 302, 304, 306, 308 and 310 in accordance with the relative priority or SL of the IG nodes. The higher the SL in the ranking associated with a particular IG node, the lower the associated target range. In this example, IG1 represented by the node 302 may have an associated target range denoted by SL A1, IG2 represented by the node 304 may have an associated target range denoted by SL A2, IG3 represented by the node 306 may have an associated target range denoted by SL A3, IG4 represented by the node 308 may have an associated target range denoted by SL A4, and IG5 represented by the node 310 may have an associated target range denoted by SL A5. The initiator group service levels (IGSLs) in the example 300 may include SLA1, SLA2, SLA3, SLA4 and SLA5. Thus the IGSL SLA1 denotes the diamond SL for IG1, IGSL SLA2 denotes the platinum SL for IG2, IGSL SLA3 denotes the gold SL for IG3, IGSL SLA4 denotes the silver SL for IG4, and SLA5 denotes the bronze SL for IG5.

As a second step S2, each of the target ranges of an IG node in the first level of 300 may be partitioned into 5 subranges, where each of the 5 subranges is associated with a different one of the 5 PGs. In this manner, each of IGSLs corresponding to one of the 5 target ranges of an IG node in the first level of the hierarchy 300 may be partitioned into 5 subranges and used to determine port group service levels (PGSLs) for the 5 PGs within each of the IGSLs. To further illustrate, the SL hierarchy 300 includes IG node 304 for IG2 having SLA2 denoting RTs that are greater than or equal to 5 ms. and less than 10 ms. The target range of SLA2, 5 ms<=x<10 ms, may be partitioned into 5 subranges, such as 5 equal subranges associated with the PG nodes 312, 314, 316, 318 and 320 of the second level of the hierarchy in accordance with the relative priority or SL of the PG nodes. The higher the SL in the ranking associated with a particular PG node, the lower the associated subrange. SLB1, SLB2, SLB3, SLB4 and SLB5 respectively of the PG nodes 312, 314, 316, 318 and 320 may denote the 5 subranges of SLA2 for the node IG2 304. Each of the subranges SLB1, SLB2, SLB3, SLB4 and SLB5 may denote SL targets or goals, respectively, of the PG nodes 312, 314, 316, 318 and 320.

In this example, PG1 represented by the node 312 may have an associated subrange denoted by SL B1, PG2 represented by the node 314 may have an associated subrange denoted by SL B2, PG3 represented by the node 316 may have an associated subrange denoted by SL B3, PG4 represented by the node 318 may have an associated subrange denoted by SL B4, and PG5 represented by the node 320 may have an associated subrange denoted by SL B5. The port group service levels (PGSLs) in the example 300 may include SLB1, SLB2, SLB3, SLB4 and SLB5. Thus the PGSL SLB1 denotes the diamond SL for PG1 312, PGSL SLB2 denotes the platinum SL for PG2 314, PGSL SLB3 denotes the gold SL for PG3 316, PGSL SLB4 denotes the silver SL for PG4 318, and SLB5 denotes the bronze SL for PG5 320.

The hierarchy 300 may represent the PG nodes 312, 314, 316, 318 and 320 as children of the parent node 304 since each of the PGSLs SLB1, SLB2, SLB3, SLB4 and SLB5 denote a subrange or partition of the parent node 304's target SL range SLA2. In a similar manner to that described for the IG node 304, each of the target ranges SLA1, SLA3, SLA4 and SLA5, respectively, of the remaining IG nodes 302, 306, 308 and 310 in the first level of 300 may be partitioned into 5 subranges, where each of the 5 subranges is associated with a different one of the 5 PGs. Although not illustrated in the example 300 for simplicity, each IG node of the first level may include 5 child PG nodes in the second level for the 5 PGs. Thus, the second level of PG nodes in the hierarchy 300 includes 25 PG nodes. For example, 5 PG nodes for PGs1-5 are included in the hierarchy 300 as children of the IG1 node 302 where one of the 5 PG nodes for the PG1 has an associated SL of 0 ms<=x<1 ms; one of the 5 PG nodes for the PG2 has an associated SL of 1 ms<=x<2 ms; one of the 5 PG nodes for the PG3 has an associated SL of 2 ms<=x<3 ms; one of the 5 PG nodes for the PG4 has an associated SL of 3 ms<=x<4 ms; and one of the 5 nodes for the PG5 has an associated SL of 4 ms<=x<5 ms.

As a third step S3, each SL range of a PG node in the second level of 300 may be further partitioned into 5 subranges, where each of the 5 subranges is associated with a different one of the 5 SGs. In this manner, each of PGSLs corresponding to one of the 5 SL ranges of PG node in the second level of the hierarchy 300 may be partitioned into 5 subranges and used to determine storage group service levels (SGSLs) for the 5 SGs within each of the PGSLs. To further illustrate, the SL hierarchy 300 includes PG node 314 for PG2 having SLB2 denoting RTs that are greater than or equal to 6 ms. and less than 6 ms. The target range of SLB2, 6 ms<=x<7 ms, may be partitioned into 5 subranges, such as 5 equal subranges associated with the SG nodes 322, 324, 326, 328 and 330 of the third level of the hierarchy in accordance with the relative priority or SL of the SG nodes. The higher the SL in the ranking associated with a particular SG node, the lower the associated subrange. SLC1, SLC2, SLC3, SLC4 and SLC5 respectively of the SG nodes 322, 324, 326, 328 and 330 may denote the 5 subranges of SLB2 for the node PG2 314. Each of the subranges SLC1, SLC2, SLC3, SLC4 and SLC5 may denote SL targets or goals, respectively, of the SG nodes 322, 324, 326, 328 and 330.

In this example, SG1 represented by the node 322 may have an associated subrange denoted by SL C1, SG2 represented by the node 324 may have an associated subrange denoted by SL C2, SG3 represented by the node 326 may have an associated subrange denoted by SL C3, SG4 represented by the node 328 may have an associated subrange denoted by SL C4, and SG5 represented by the node 330 may have an associated subrange denoted by SLC5. The storage group service levels (SGSLs) in the example 300 may include SLC1, SLC2, SLC3, SLC4 and SLC5. Thus the SGSL SLC1 denotes the diamond SL for SG1 322, SGSL SLC2 denotes the platinum SL for SG2 324, SGSL SLC3 denotes the gold SL for SG3 326, SGSL SLC4 denotes the silver SL for SG4 328, and SLC5 denotes the bronze SL for SG5 330.

The hierarchy 300 may represent the SG nodes 322, 324, 326, 328 and 330 as children of the parent PG node 314 since each of the SGSLs SLC1, SLC2, SLC3, SLC4 and SLC5 denote a subrange or partition of the parent PG node 314's SL range SLB2. In a similar manner to that described for the PG node 314, each of the target ranges SLB1, SLB3, SLB4 and SLB5, respectively, of the remaining PG nodes 312, 316, 318 and 330 in the second level of 300 may be partitioned into 5 subranges, where each of the 5 subranges is associated with a different one of the 5 SGs. Although not illustrated in the example 300 for simplicity, each PG node of the second level may include 5 child SG nodes in the third level for the 5 SGs. Thus, the third level of SG nodes in the hierarchy 300 may include 125 SG nodes (e.g., 5 SG nodes in the third level for each of the 25 PG nodes in the second level). For example, 5 SG nodes for SGs1-5 are included in the hierarchy 300 as children of the PG node 312 (having SLB1 denoting the RTs x, where 5 ms<=x<6 ms) where one of the 5 nodes for the SG1 has an associated SL of 5 ms<=x<5.2 ms; one of the 5 nodes for the SG2 has an associated SL of 5.2 ms<=x<5.4 ms; one of the 5 nodes for the SG3 has an associated SL of 5.4 ms<=x<5.6 ms; one of the 5 nodes for the SG4 has an associated SL of 5.6 ms<=x<5.8 ms; and one of the 5 nodes for the SG5 has an associated SL of 5.8 ms<=x<6 ms.

Generally, a parent node in the hierarchy 300 has child nodes with associated SLs that are based on the particular SL of the parent node. Processing may be performed to partition the SL range of a parent node into subranges, and then specify each of the subranges as an SL of one of the children of the parent. The particular number of subranges, N, may correspond to the number of SLs in the level of the hierarchy at which the child nodes are included. In at least one embodiment, the N subranges determined for child nodes of a parent may be non-overlapping. In at least one embodiment, each of the N subranges may be the same size denoted by a distance spanning from the lower bound to the upper bound of each subrange.

In the example 300, each IG node of the first level of the hierarchy may also be characterized as a root node of a smaller hierarchy or tree. Each such smaller hierarchy or tree generally includes all descendant nodes of the root node of the tree. For example, a hierarchy or tree structure includes the IG2 node 304 as the root node at the first level and all the descendant nodes of the node 304. Such descendant nodes include a first set of the PG nodes of the second level that are children of the node 304, and also includes all SG nodes of the third level that are children of the first set of PG nodes.

In at least one embodiment, a table of the triples and associated SLs may be generated using the hierarchy 300 based on the top down or IG-based approach described herein. An embodiment may form a triple including an IG represented by a node in the first level, a PG represented by a node in the second level, and an SG represented by a node in the third level. The nodes of the third level are SG nodes and are also leaf nodes or leaves of the hierarchy 300. The hierarchy 300 may be traversed to determine all paths from one of nodes of the first level to one of the leaf nodes of the third level. In this manner, each path includes 3 nodes—an IG represented by a node in the first level, a PG represented by a node in the second level, and an SG represented by a node in the third level—where the IG, PG and SG form one of the triples. Associated with each such path and triple is an SL denoting target I/O RT or I/O latency, where the SL denoting the target I/O RT or I/O latency is the SL associated with the leaf node of the path. For a given triple including an IG, PG and SG, an I/O received at a port of the data storage system included in the PG, where the I/O is sent from an initiator included in the IG, and wherein the I/O is directed to a storage object included in the SG, the I/O is assigned an SL associated with the given triple.

Figure 7:
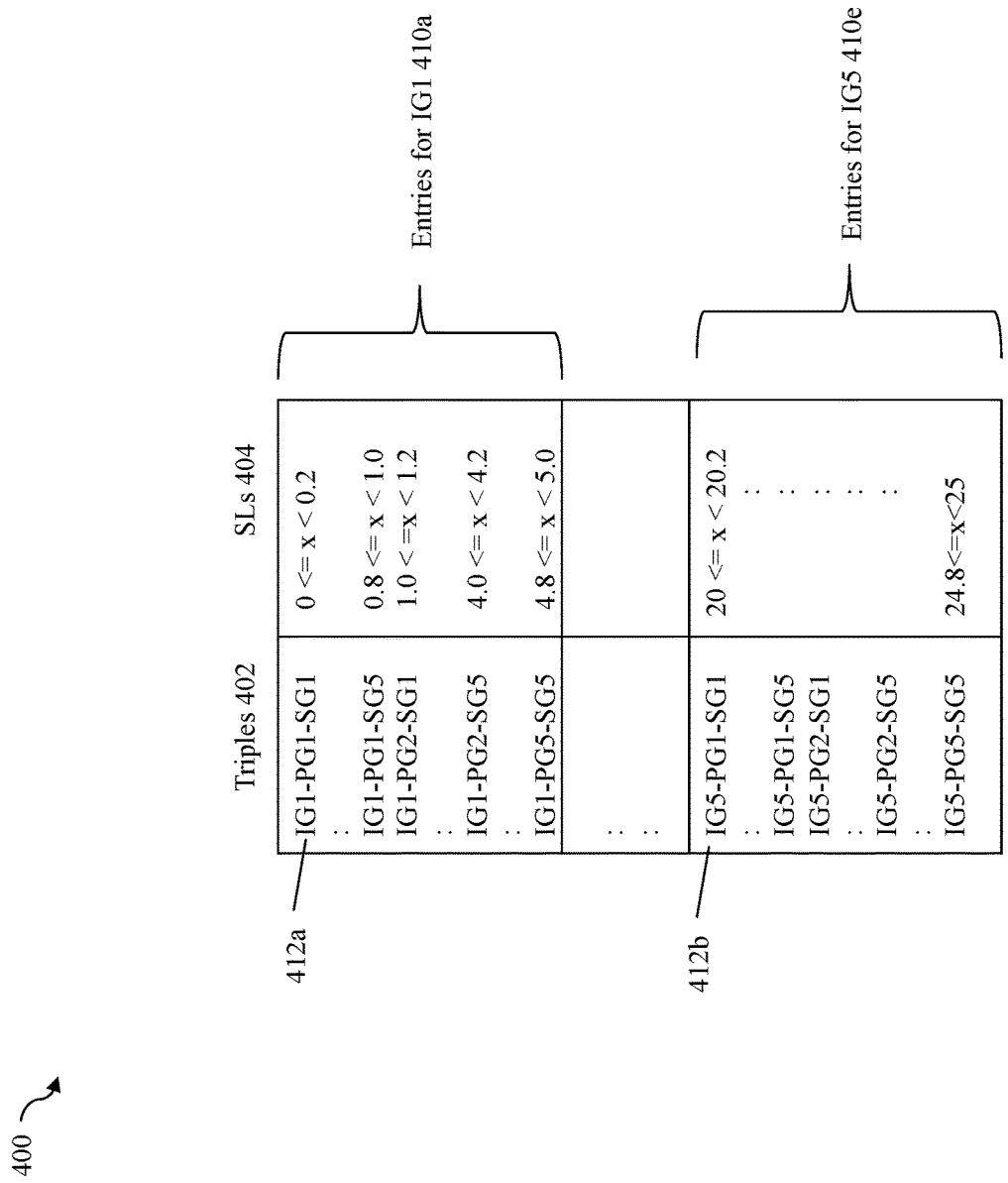
FIGS. 7 and 9 are examples of tables of triples and associated service levels that may be generated and used in an embodiment in accordance with the techniques herein.

Referring to FIG. 7, shown is an example 400 of the table of triples and associated SLs generated using the hierarchy 300 based on the top down or IG-based approach described herein. The table 400 includes a first column 402 of the triples and a second column 404 of the SLs. Each row or entry of the table includes a triple (column 402) and an associated SL (column 404) for the triple. The numeric values in the ranges of the SLs 404 are in milliseconds where the "x" denotes the acceptable or target RT values in the range. For example, the row 412a indicates that an I/O received at a port of the data storage system included in the PG1, where the I/O is sent from an initiator included in the IG1, and where the I/O is directed to a storage object included in the SG1, the I/O is assigned the SL target, range 0<=x<0.2, associated with the given triple IG1-PG1-SG1 of the row 412a. The SL target range 0<=x<0.2 indicates an I/O RT target or goal where the RT=x, and is greater than or equal to 0 but also less than 0.2 ms. As another example, the row 412b indicates that an I/O received at a port of the data storage system included in the PG1, where the I/O is sent from an initiator included in the IG5, and where the I/O is directed to a storage object included in the SG1, the I/O is assigned the SL target, range 20<=x<20.2, associated with the given triple IG5-PG1-SG1 of the row 412b. The SL target range of "20<=x<20.2" indicates an I/O RT target or goal, where the RT=x, and is greater than or equal to 20 but also less than 20.2 ms.

The table 400 in this example is based on the SL hierarchy described in connection with FIG. 6, where the SL hierarchy 300 when fully generated has 125 leaf nodes in level 3 as described elsewhere herein. In this case, the table 400 may include 25 entries or rows for each of the 5 IGs represented by the IG nodes 302, 304, 306, 308 and 310 of the FIG. 6. For example, the element 410a denotes the set of 25 entries of the table 400 for IG1 and the element 410e denotes the set of 25 entries of the table 400 for IG 5.

In at least one embodiment in accordance with the techniques herein, the table 400 of the FIG. 7 may be generated generally prior to receiving I/O operations. The table 400 may then be used to configure SLs or I/O latency goals expressed, for example, as a RT range, for the different configurable entities such as IGs, PGs and SGs. Additionally, the SL associated with each triple may be assigned to an I/O that is directed to an SG of the triple and that is also received over paths covered by the triple (e.g., where the I/O is sent from an initiator included in an IG of the triple and received at a data storage system port included in a PG of the triple).

In at least one embodiment using the NVMeoF TCP protocol, the various SLs for the configurable entities (e.g., IGs, PGs, and SGs) may be established using the SLs determined using the top down or IG-based approach at the time a particular path or connection is established to each I/O queue. For example, the SLs may be determined at the time of TCP connection and the subsequent NVMe Fabric connection to each I/O queue. In such an embodiment, an SL and associated I/O target RT goal may be assigned to each I/O command received by an I/O controller at the time the I/O is received at the data storage system port.

Figure 8:
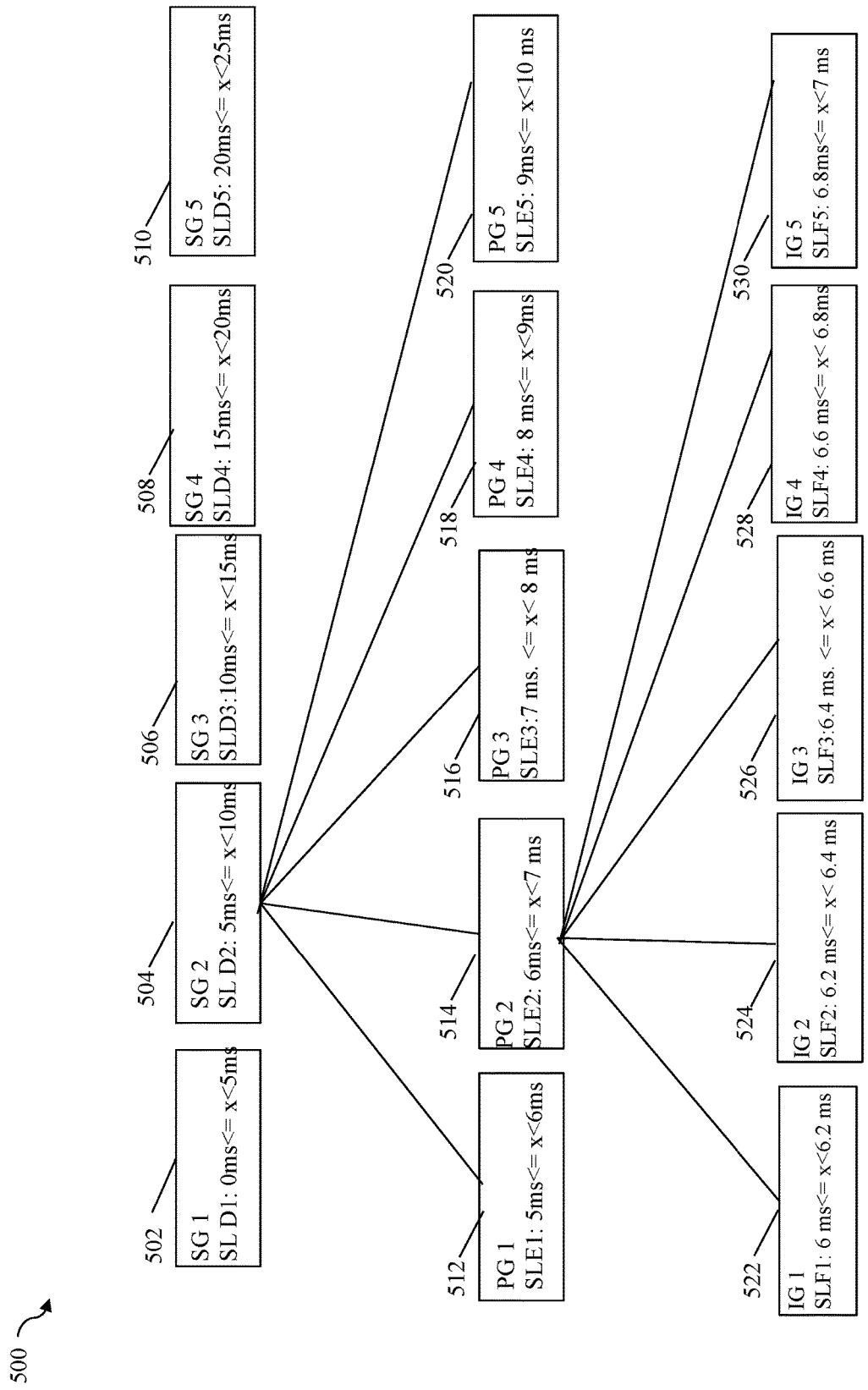

What will now be described with reference to FIG. 8 is how to determine SLs for I/Os using the bottom up or SG-based approach where I/O traffic is prioritized based on SGs. As described elsewhere herein, a configurable option or input, such as from a customer or user may be provided that indicates a selection to proceed with either the top down or IG-based approach where I/O traffic is prioritized based on IGs, or whether to proceed with the bottom up of SG-based approach where I/O traffic is prioritized based on SGs. In connection with FIG. 8, processing is described in the following paragraphs for determining SLs for I/Os using the bottom up or SG-based approach where I/O traffic is prioritized based on SGs.

Referring to FIG. 8, shown is an example 500 illustrating nodes of the SL hierarchy or structure that may be used in an embodiment in accordance with the techniques herein with the bottom up or SG-based approach where I/O traffic is prioritized based on SGs. The example 500 includes nodes 502, 504, 506, 508 and 510 of a first level in the hierarchy. Each of the nodes in the first level represent a different one of the 5 SGs.

As a first step S11, a target I/O range or latency may be specified for each of the SG nodes in the first level of the hierarchy 500. In at least one embodiment, the overall aggregate of the target ranges specified for the SG nodes 502, 504, 506, 508 and 510 may form a contiguous range of I/O RTs when the target ranges of the 5G nodes are arranged sequentially in order based on their relative priority. In the example 500, the overall target range denoted by the SG nodes 502, 504, 506, 508 and 510 includes all RTs "x" that are greater than 0 and less than 25 (e.g., all the values x, where 0 ms.<=x<25 ms.) The overall target range of I/O RTs may be partitioned into smaller target ranges associated with the 5G nodes 502, 504, 506, 508 and 510. In this example 500, the overall target range may be partitioned into 5 equal partitions or target ranges associated with the 5G nodes 502, 504, 506, 508 and 510 in accordance with the relative priority or SL of the SG nodes. The higher the SL in the ranking associated with a particular SG node, the lower the associated target range. In this example, SG1 represented by the node 502 may have an associated target range denoted by SL D1, SG2 represented by the node 504 may have an associated target range denoted by SL D2, SG3 represented by the node 506 may have an associated target range denoted by SL D3, ISG4 represented by the node 508 may have an associated target range denoted by SL D4, and SG5 represented by the node 510 may have an associated target range denoted by SL D5. The SGSLs in the example 500 may include SLD1, SLD2, SLD3, SLD4 and SLD5. Thus the SGSL SLD1 denotes the diamond SL for SG1, SGSL SLD2 denotes the platinum SL for SG2, SGSL SLD3 denotes the gold SL for SG3, SGSL SLD4 denotes the silver SL for SG4, and SGSL SLD5 denotes the bronze SL for SG5.

As a second step S12, each of the target ranges of an SG node in the first level of 500 may be partitioned into 5 subranges, where each of the 5 subranges is associated with a different one of the 5 SGs. In this manner, each of SGSLs corresponding to one of the 5 target ranges of an SG node in the first level of the hierarchy 500 may be partitioned into 5 subranges and used to determine PGSLs for the 5 PGs within each of the SGSLs. To further illustrate, the SL hierarchy 500 includes SG node 504 for SG2 having SLD2 denoting RTs that are greater than or equal to 5 ms. and less than 10 ms. The target range of SLD2, 5 ms<=x<10 ms, may be partitioned into 5 subranges, such as 5 equal subranges associated with the PG nodes 512, 514, 516, 518 and 520 of the second level of the hierarchy in accordance with the relative priority or SL of the PG nodes. The higher the SL in the ranking associated with a particular PG node, the lower the associated subrange. SLE1, SLE2, SLE3, SLE4 and SLE5 respectively of the PG nodes 512, 514, 516, 518 and 520 may denote the 5 subranges of SLD2 for the node SG2 504. Each of the subranges SLE1, SLE2, SLE3, SLE4 and SLE5 may denote SL targets or goals, respectively, of the PG nodes 512, 514, 516, 518 and 520.

In this example, PG1 represented by the node 512 may have an associated subrange denoted by SLE1, PG2 represented by the node 514 may have an associated subrange denoted by SLE2, PG3 represented by the node 516 may have an associated subrange denoted by SLE3, PG4 represented by the node 518 may have an associated subrange denoted by SLE4, and PG5 represented by the node 520 may have an associated subrange denoted by SLE5. The port group service levels (PGSLs) in the example 500 may include SLE1, SLE2, SLE3, SLE4 and SLE5. Thus the PGSL SLE1 denotes the diamond SL for PG1 512, PGSL SLE2 denotes the platinum SL for PG2 514, PGSL SLE3 denotes the gold SL for PG3 516, PGSL SLE4 denotes the silver SL for PG4 518, and SLE5 denotes the bronze SL for PG5 520.

The hierarchy 500 may represent the PG nodes 512, 514, 516, 518 and 520 as children of the parent node 504 since each of the PGSLs SLE1, SLE2, SLE3, SLE4 and SLE5 denotes a subrange or partition of the parent node 504's target SL range SLD2. In a similar manner to that described for the IG node 504, each of the target ranges SLE1, SLE2, SLE3, SLE4 and SLE5, respectively, of the remaining IG nodes 502, 506, 508 and 510 in the first level of 500 may be partitioned into 5 subranges, where each of the 5 subranges is associated with a different one of the 5 PGs. Although not illustrated in the example 500 for simplicity, each SG node of the first level may include 5 child PG nodes in the second level for the 5 PGs. Thus, the second level of PG nodes in the hierarchy 500 includes 25 PG nodes. For example, 5 PG nodes for PGs1-5 are included in the hierarchy 500 as children of the SG 1 node 502 where one of the 5 PG nodes for the PG1 has an associated SL of 0 ms<=x<1 ms; one of the 5 PG nodes for the PG2 has an associated SL of 1 ms<=x<2 ms; one of the 5 PG nodes for the PG3 has an associated SL of 2 ms<=x<3 ms; one of the 5 PG nodes for the PG4 has an associated SL of 3 ms<=x<4 ms; and one of the 5 nodes for the PG5 has an associated SL of 4 ms<=x<5 ms.

As a third step S13, each SL range of a PG node in the second level of 500 may be further partitioned into 5 subranges, where each of the 5 subranges is associated with a different one of the 5 SGs. In this manner, each of the PGSLs corresponding to one of the 5 SL ranges of a PG node in the second level of the hierarchy 500 may be partitioned into 5 subranges and used to determine IGSLs for the 5 IGs within each of the PGSLs. To further illustrate, the SL hierarchy 500 includes PG node 514 for PG2 having SLE2 denoting RTs that are greater than or equal to 6 ms. and less than 6 ms. The target range of SLE2, 6 ms<=x<7 ms, may be partitioned into 5 subranges, such as 5 equal subranges associated with the SLs of the IG nodes 522, 524, 526, 528 and 530 of the third level of the hierarchy in accordance with the relative priority or SL of the IG nodes. The higher the SL in the ranking associated with a particular IG node, the lower the associated subrange. SLF1, SLF2, SLF3, SLF4 and SLF5 respectively of the IG nodes 522, 524, 526, 528 and 530 may denote the 5 subranges of SLE2 for the node PG2 514. Each of the subranges SLF1, SLF2, SLF3, SLF4 and SLF5 may denote SL targets or goals, respectively, of the IG nodes 522, 524, 526, 528 and 530.

In this example, IG1 represented by the node 522 may have an associated subrange denoted by SLF1, IG2 represented by the node 524 may have an associated subrange denoted by SLF2, IG3 represented by the node 526 may have an associated subrange denoted by SLF3, IG4 represented by the node 528 may have an associated subrange denoted by SLF4, and IG5 represented by the node 530 may have an associated subrange denoted by SLF5. The IGSLs in the example 500 may include SLF1, SLF2, SLF3, SLF4 and SLF5. Thus the IGSL SLF1 denotes the diamond SL for IG1 522, SGSL SLF2 denotes the platinum SL for IG2 524, SGSL SLF3 denotes the gold SL for IG3 526, IGSL SLF4 denotes the silver SL for IG4 528, and SLF5 denotes the bronze SL for IG5 530.

The hierarchy 500 may represent the IG nodes 522, 524, 526, 528 and 530 as children of the parent PG node 514 since each of the IGSLs SLF1, SLF2, SLF3, SLF4 and SLF5 denote a subrange or partition of the parent PG node 514's SL range SLE2. In a similar manner to that described for the PG node 514, each of the target ranges SLE1, SLE3, SLE4 and SLE5, respectively, of the remaining PG nodes 512, 516, 518 and 530 in the second level of 500 may be partitioned into 5 subranges, where each of the 5 subranges is associated with a different one of the 5 IGs. Although not illustrated in the example 500 for simplicity, each PG node of the second level may include 5 child IG nodes in the third level for the 5 IGs. Thus, the third level of IG nodes in the hierarchy 500 may include 125 IG nodes (e.g., 5 IG nodes in the third level for each of the 25 PG nodes in the second level). For example, 5 IG nodes for IGs1-5 are included in the hierarchy 500 as children of the PG node 512 (having SLE1 denoting the RTs x, where 5 ms<=x<6 ms) where one of the 5 child nodes of 512 for the IG1 has an associated SL of 5 ms<=x<5.2 ms; one of the 5 child nodes of 512 for the IG2 has an associated SL of 5.2 ms<=x<5.4 ms; one of the 5 child nodes of 512 for the IG3 has an associated SL of 5.4 ms<=x<5.6 ms; one of the 5 child nodes of 512 for the IG4 has an associated SL of 5.6 ms<=x<5.8 ms; and one of the 5 child nodes of 512 for the IG5 has an associated SL of 5.8 ms<=x<6 ms.

Generally, a parent node in the hierarchy 500 has child nodes with associated SLs that are based on the particular SL of the parent node. Processing may be performed to partition the SL range of the parent node into subranges, and then specify each of the subranges as an SL of one of the children of the parent. The particular number of subranges, N, may correspond to the number of SLs in the level of the hierarchy at which the child nodes are included. In at least one embodiment, the N subranges determined for child nodes of a parent may be non-overlapping. In at least one embodiment, each of the N subranges may be the same size denoted by a distance spanning from the lower bound of to the upper bound of each subrange.

In the example 500, each SG node of the first level of the hierarchy may also be characterized as a root node of a smaller hierarchy or tree. Each such smaller hierarchy or tree generally includes all descendant nodes of the root node of the tree. For example, a hierarchy or tree structure includes the SG2 node 304 as the root node at the first level and all the descendant nodes of the node 5304. Such descendant nodes include a first set of the PG nodes of the second level that are children of the node 504, and also includes all SG nodes of the third level that are children of the first set of PG nodes.

In at least one embodiment, a table of the triples and associated SLs may be generated using the hierarchy 500 based on the bottom up or SG-based approach described herein. An embodiment may form a triple including an SG represented by a node in the first level, a PG represented by a node in the second level, and an IG represented by a node in the third level. The nodes of the third level are IG nodes and are also leaf nodes or leaves of the hierarchy 500. The hierarchy 500 may be traversed to determine all paths from one of the nodes of the first level to one of the leaf nodes of the third level. In this manner, each path includes 3 nodes— an SG represented by a node in the first level, a PG represented by a node in the second level, and an IG represented by a node in the third level—where the IG, PG and SG form one of the triples. Associated with each such path and triple is an SL denoting target I/O RT or I/O latency, where the SL denoting the target I/O RT or I/O latency is the SL associated with the leaf node of the path. For a given triple including an IG, PG and SG, an I/O received at a port of the data storage system included in the PG, where the I/O is sent from an initiator included in the IG, and wherein the I/O is directed to a storage object included in the SG, the I/O is assigned an SL associated with the given triple.

Figure 9:
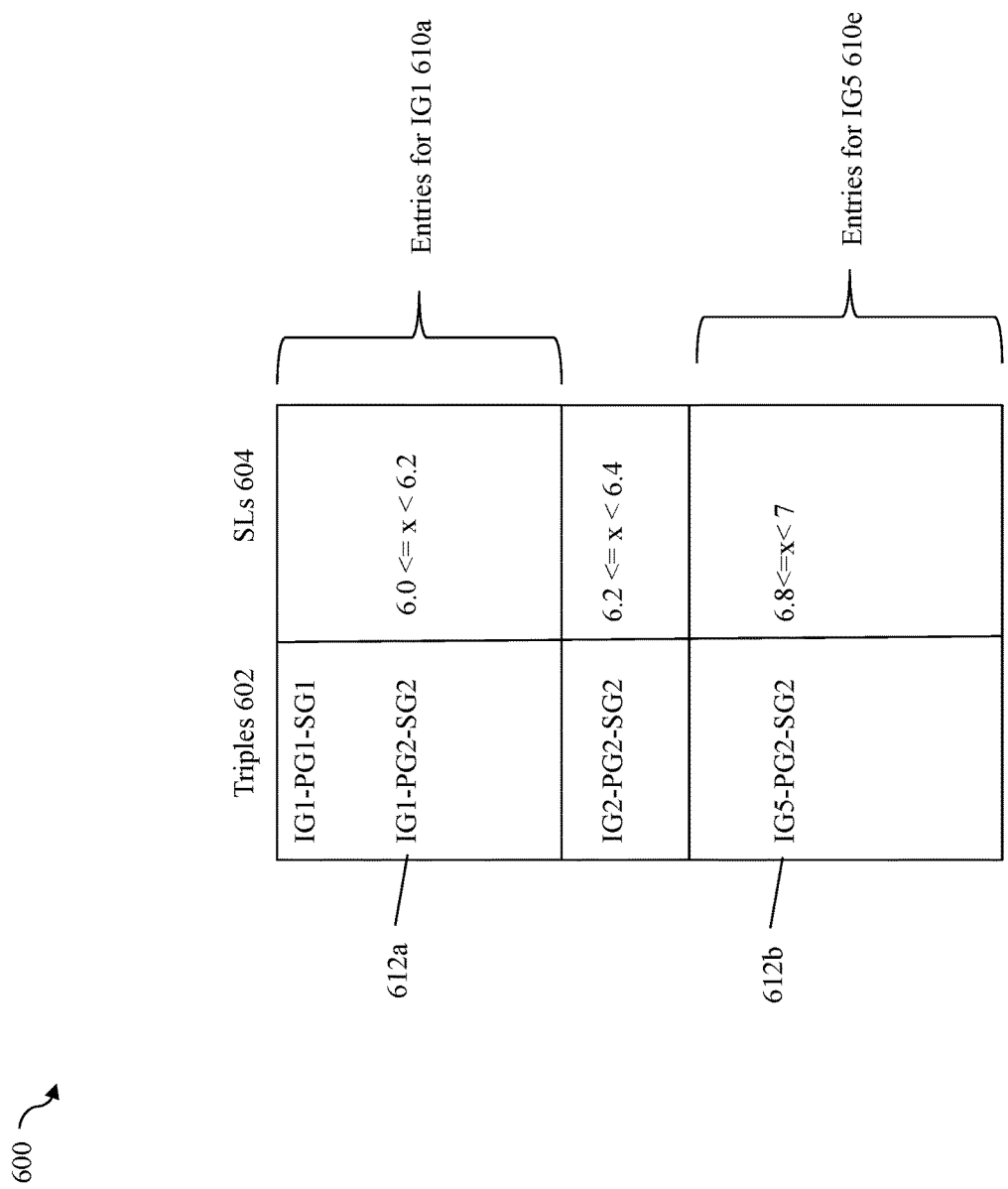

Referring to FIG. 9, shown is an example 600 of the table of triples and associated SLs generated using the hierarchy 500 based on the bottom up or SG-based approach described herein. The table 600 includes a first column 602 of the triples and a second column 604 of the SLs. Each row or entry of the table includes a triple (column 602) and an associated SL (column 604) for the triple. The numeric values in the ranges of the SLs 604 are in milliseconds where the "x" denotes the acceptable or target RT values in the range. For example, the row 612a indicates that an I/O received at a port of the data storage system included in the PG2, where the I/O is sent from an initiator included in the IG1, and where the I/O is directed to a storage object included in the SG2, the I/O is assigned the SL target, range 6.0<=x<6.2, that is associated with the given triple IG1-PG2-SG2 of the row 612a. The SL target range 6.0<=x<6.2 indicates an I/O RT target or goal where the RT=x, and is greater than or equal to 6 but also less than 6.2 ms. As another example, the row 612b indicates that an I/O received at a port of the data storage system included in the PG2, where the I/O is sent from an initiator included in the IG5, and where the I/O is directed to a storage object included in the SG2, the I/O is assigned the SL target, range 6.8<=x<7, associated with the given triple IG5-PG2-SG2 of the row 612b. The SL target range of "6.8<=x<7" indicates an I/O RT target or goal, where the RT=x, and is greater than or equal to 6.8 but also less than 7 ms.

The table 600 in this example is based on the SL hierarchy described in connection with FIG. 8, where the SL hierarchy when fully generated has 125 leaf nodes in level 3 as described elsewhere herein. In this case, the table 600 may include 25 entries or rows for each of the 5 IGs. For example, the element 610a denotes the set of 25 entries of the table 600 for IG1 and the element 610e denotes the set of 25 entries of the table 600 for IG 5.

In at least one embodiment in accordance with the techniques herein, the table 600 of the FIG. 9 may be generated generally prior to receiving I/O operations. The table 600 may then be used to configure SLs or I/O latency goals expressed, for example, as a RT range, for the different configurable entities such as IGs, PGs and SGs. Additionally, the SL associated with each triple may be assigned to an I/O that is directed to an SG of the triple and that is also received over paths covered by the triple (e.g., where the I/O is sent from an initiator included in an IG of the triple and received at a data storage system port included in a PG of the triple).

In at least one embodiment using the NVMeoF TCP protocol, the various SLs for the configurable entities (e.g., IGs, PGs, and SGs) may be established using the SLs determined using the bottom up or SG-based approach at the time a particular path or connection is established to each I/O queue. For example, the SLs may be determined at the time of TCP connection and the subsequent NVMe Fabric connection to each I/O queue. In such an embodiment, an SL and associated I/O target RT goal may be assigned to each I/O command received by an I/O controller at the time the I/O is received at the data storage system port.

Figure 10:
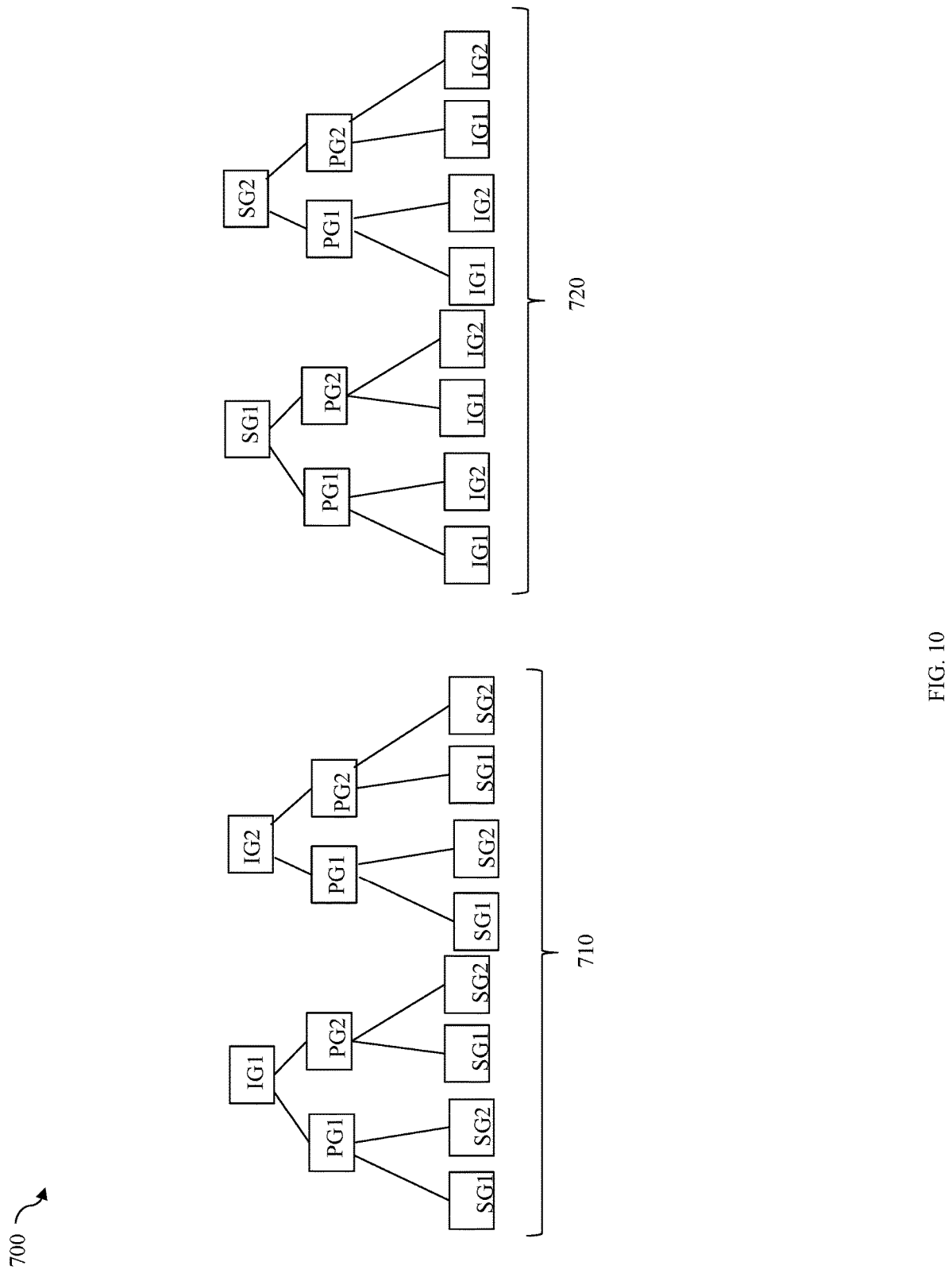

Referring to FIG. 10, shown is another example 700 illustrating fully generated SL hierarchies in an embodiment in accordance with the techniques herein. The example 700 is a simpler examples than that as described in connection with prior examples above. In the example 700, there are 2 SLs and thus 2 configured entities of each type, where there are 2 IGs (IG1 and IG2), 2 PGs (PG1 and PG2) and 2 SGs (SG1 and SG2). The SL structure 710 may be generated using the top down or IG-based approach such as described herein in connection with the FIG. 6. The SL structure 720 may be generated using the bottom up or SG-based approach such as described herein in connection with the FIG. 8. Each of the hierarchies 710 and 720 may be characterized as fully generated in that all nodes are generated for each level of the hierarchies. In contrast for simplicity, FIGS. 6 and 8 as discussed elsewhere herein denote generation of only some nodes at the second and third levels to illustrate use of the techniques herein.

The techniques herein as discussed above provide for a finer granularity of control in specifying SLs in multiple levels or dimensions, such as the 3 levels of each of the SL hierarchies generated using the top down or IG-based approach and using the bottom up or SG based approach. A customer may use such finer granularity of SL controls, for example, in connection with troubleshooting such as to identify particular bottlenecks or performance problems. Additionally, using the techniques herein allows a customer to more easily implement SL changes that may be used to alleviate or reduce a bottleneck or performance problem. For example, a customer may use the techniques herein to isolate problem connections to an SG and take corrective actions. The techniques herein also may be used to prioritize I/O traffic based on particular IGs such as, for example, to elevate or increase the SL of particular IGs used by performance critical or important host-side applications.

To further illustrate possible non-limiting uses of the techniques herein, reference is made back to FIG. 3. A slow drain problem, causing network congestion and reduced network and switch performance, may result in cases where there is a bandwidth or speed mismatch in connection with negotiated communication speeds of links 110a and 112a. Generally, the link having the faster communication rate or speed may consume an excessive amount of switch buffers. In particular, the switch 140 through which communications are made between the host and data storage system may lack sufficient quality of service or controlling mechanisms that control and limit buffer consumption, for example, used for buffering message from any particular entity (e.g., port of a host or data storage system) connected thereto.

To further illustrate with reference to FIG. 3, assume the host 102 negotiates a first communication speed of 8 GBs per second with the switch 140 for data transmission over 110a, and the data storage system 120 negotiates a second communication speed of 16 GBs per second with the switch 140 for data transmission over 112a. The host 102 may issue read I/Os over 110a, 112a to data storage system 120. In response, the data storage system 120 may return requested read data to the host 102. In particular, the data storage system 120 transmits the requested read data at a speed or rate of 16 GBs/second over 112a to the switch 140 where the read data may be stored in buffers of the switch 140 until transmitted over 110a to the host 102. In one aspect, the read data may be characterized as "drained" from the switch 140 and transmitted over 110a to host 102 at the slower first communication speed of 8 GBs/second. In connection with such disparate or mismatched communication speeds of 16 GBs/second and 8 GBs/second, an excessive amount of read data may be buffered in the buffers of the switch 140. Such conditions may result due to the data storage system 120 transmitting the read data over 112a to the switch 140 at 16 GBs/second, which is twice the rate at which the buffered read data in switch 140 is sent to the host 102 over 110a (having a communication speed or rate of 8 GBs/second). Generally such a scenario as just described illustrating the slow drain problem may result in cases where the buffered data in the switch is drained over 110a at a much slower speed or rate in comparison to the speed or rate at which the data is sent to the switch over 112a.

The slow drain problem may also occur where there is a relative communication rate or speed disparity between 110a and 112a where the communication speed or rate of 110a is larger than the communication speed or rate of 112a. To further illustrate with reference to FIG. 3, assume the host 102 negotiates a first communication speed of 16 GBs per second with the switch 140 for data transmission over 110a, and the data storage system 120 negotiates a second communication speed of 8 GBs per second with the switch 140 for data transmission over 112a. The host 102 may issue write I/Os over 110a, 112a to data storage system 120. In particular, the host 102 may send the write data over 110a to switch 140 at a rate of 16 GBs/second where the write data is stored in buffers 241 until transmitted to the data storage system 120 over 112a. In one aspect, the write data may be characterized as "drained" from the switch 140 and transmitted over 112a to data storage system 120 at the slower communication speed of 8 GBs/second. In connection with such disparate or mismatched communication speeds of 16 GBs/second (110a) and 8 GBs/second (112a), an excessive amount of write data may be buffered in the buffers of the switch 140. Such conditions may result due to the host 102 transmitting the write data over 110a to the switch 140 at 16 GBs/second, which is twice the rate at which the buffered write data in switch 140 is sent to the data storage system 120 over 112a (having a communication speed or rate of 8 GBs/second). Generally such a scenario as just described illustrating the slow drain problem may result in cases where the buffered data in the switch is "drained" over 112a at a much slower speed or rate in comparison to the speed or rate at which the data is sent to the switch over 110a.

The techniques herein may be used in connection with identifying potential bottlenecks resulting from the slow drain problem discussed above. In connection with generally identifying bottlenecks, for example, the average amount of time that has elapsed for I/Os arriving from a particular IG to a particular PG may be measured to determine whether such I/Os are meeting their intermediate SL associated with the particular PG at the PG level. For example, with reference to FIG. 6, it may be determined that I/Os arriving at PG2 from IG2 have, on average, taken an amount of time that exceeds the maximum 7 ms. of SLB2 of the node 314 for PG2. The foregoing may indicate a possible slow drain problem (e.g., links between the initiators of IG2 and the switch may have higher negotiated communication speeds than other links between the target ports of PG2 of data storage system and the switch). In response, the techniques herein may be used to slow down the rate of transmission of data or I/Os sent from IG2 by reassigning IG2 a lower priority SL. For example, priorities or SLs associated with the node IG2 304 and the node IG5 310 may be swapped in order to slow down the rate at which write I/Os are sent from IG2. For example, the SLA2 range of 5 ms.≤x<10 ms., where x denotes the target or goal, assigned to IG2 304 may be reassigned to IG5 310, and the SLA5 range of 20 ms.≤x<25 ms, where x denotes the target or goal, assigned to IG5 may be reassigned to IG2. In other words, IG2 304 is assigned the bronze IGSL and IG5 310 is assigned the platinum IGSL.

The foregoing is one example of how the techniques herein may be utilized to control the rate at which I/Os are sent from particular IGs, and thus hosts, to the data storage system. As another example, the SLs associated with the particular IGs may be assigned or reassigned in order to increase the I/O RT performance for a particular host or application using one or more of the IGs.

Generally, the techniques herein may be used in connection with the top down or IG-based approach to prioritize I/O traffic based on the various IGs. The techniques herein may be used in connection with the bottom up or SG-based approach to prioritize I/O traffic based on the various SGs. In connection with both the top down and bottom up approaches, the SLs at the different IG, PG and SG levels may also be modified among the different IG, PG and SG entities to facilitate the desired control and prioritization of I/O traffic in a SAN. For example, in connection with the bottom up or SG-based approach, the SLs of the PGs may be monitored to assist in identifying a lower priority SG causing a bottleneck for a higher priority SG on the same PG.

Figure 11:
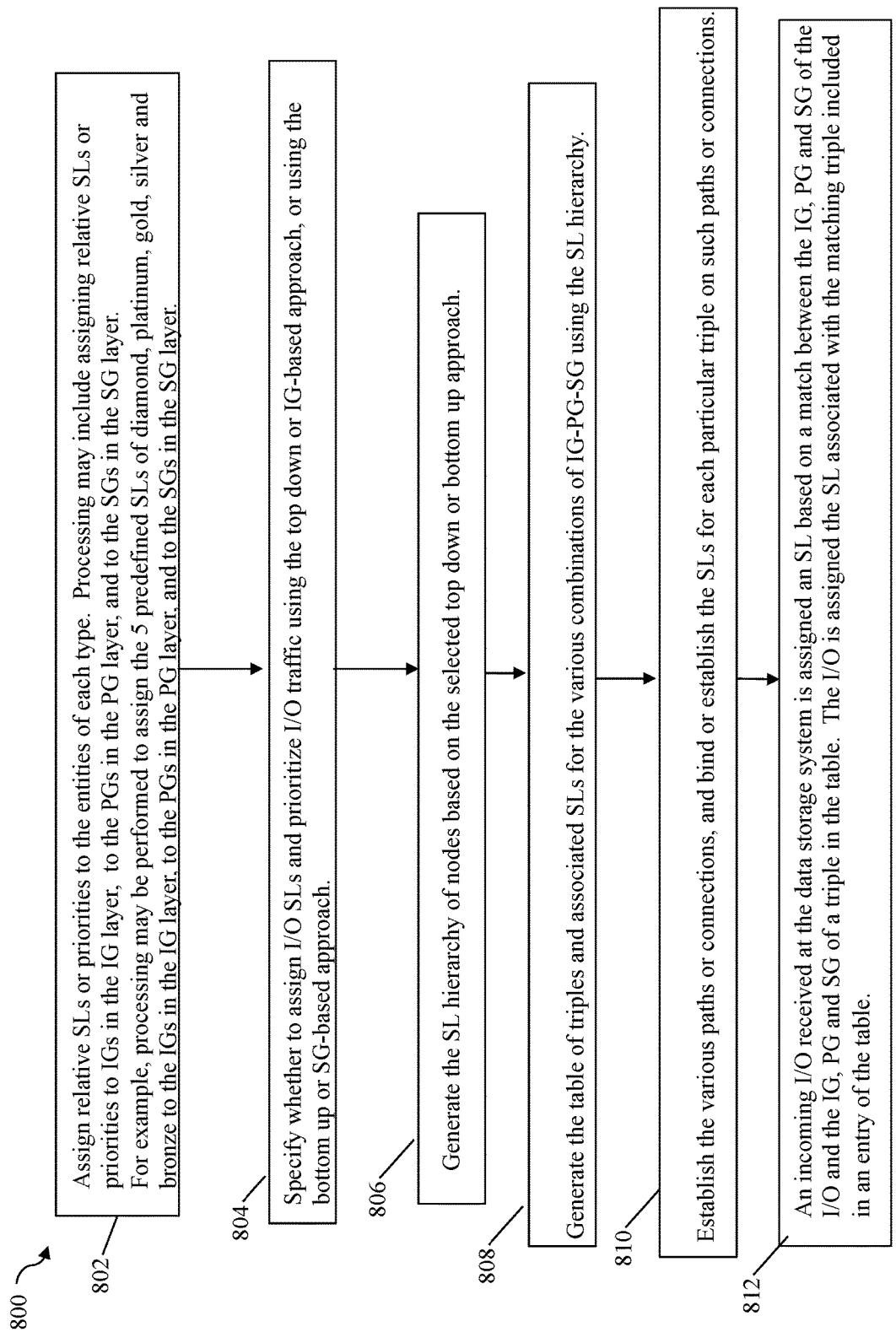
FIG. 11 is a flowchart of processing steps that may be performed in an embodiment in accordance with the techniques herein.

Referring to FIG. 11, shown is a flowchart 800 of processing steps that may be performed in an embodiment in accordance with the techniques herein. The flowchart 800 summarizes processing described above.

At the step 802, processing is performed to assign relative SLs or priorities to the entities of each type. Processing of the step 802 may include assigning relative SLs or priorities to IGs in the IG layer, to the PGs in the PG layer, and to the SGs in the SG layer. For example, processing may be performed to assign the 5 predefined SLs of diamond, platinum, gold, silver and bronze to the IGs in the IG layer, to the PGs in the PG layer, and to the SGs in the SG layer. As discussed above, in at least one embodiment, a customer may be allowed to configure or specify the relative SLs or priorities of the entities of the different types of groups. From the step 802, control proceeds to the step 804.

At the step 804, processing is performed to specify whether to assign I/O SLs and prioritize I/O traffic using the top down or IG-based approach, or using the bottom up or SG-based approach. In at least one embodiment as described herein, a customer may specify whether to assign I/O SLs and prioritize I/O traffic using the top down or IG-based approach, or using the bottom up or SG-based approach. From the step 804, control proceeds to the step 806.

At the step 806, processing is performed to generate the SL hierarchy of nodes based on the selected top down or bottom up approach. For example, the SL hierarchy such as described in connection with FIG. 6 may be generated if a customer selects in the step 804 to proceed with the bottom up or IG-based approach. The SL hierarchy such as described in connection with FIG. 8 may be generated if a customer selects in the step 804 to proceed with the top down or SG-based approach. As a result of performing the step 806, a complete or full SL hierarchy may be generated such as described herein and as illustrated, for example, in FIG. 10. From the step 806, control proceeds to the step 808.

At the step 808, processing is performed to generate the table of triples and associated SLs for the various combinations of IG-PG-SG using the SL hierarchy. FIGS. 7 and 9 are examples of the table that may be generated in the step 808 in an embodiment in accordance with the techniques herein. From the step 808, control proceeds to the step 810.

At the step 810, processing may be performed to establish the various paths or connections between the host(s) and the data storage system. The step 810 may also include binding or establishing the SLs in the data storage system for each particular triple on such paths or connections. The particular way in which the step 810 is implemented may vary with the protocol(s) used in an embodiment. The processing of the step 810 may include binding the various SLs of the table generated in the step 808 for particular triples to the established paths or connections between the host and the data storage system for the SG entities. From the step 810, control proceeds to the step 812.

At the step 812, an incoming I/O received at the data storage system may be assigned an SL based on a match between the IG, PG and SG of the I/O and the IG, PG and SG of a triple in the table. The I/O is assigned the SL associated with the matching triple included in an entry of the table.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining service levels comprising:
receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and
responsive to the first target port of the data storage system receiving the I/O operation, the data storage system assigning the I/O operation a first service level using a table of a plurality service levels for a plurality of triples, wherein each of the plurality of service levels is associated with one of the plurality of triples and denotes a target level of I/O response time performance for said one triple, wherein each of the plurality of triples identifies one of the plurality of initiator groups, one of the plurality of storage groups and one of the plurality of port groups, wherein the first service level denotes a target I/O response time for servicing the I/O operation, wherein said assigning includes:
determining a first triple of the plurality of triples that matches the first storage group, the first initiator group and the first port group, wherein the first triple is associated with the first service level.

2. A method of determining service levels comprising:
receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and
assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:

determining a first triple of the plurality of triples that matches the first storage group, the first initiator group and the first port group, wherein the first triple is associated with the first service level; and wherein the method further includes:

determining that service levels are assigned to I/O operations based on initiator group service levels (IGSLs); and responsive to determining that service levels are assigned to I/O operations based on the IGSLs, performing first processing that creates the table of the plurality of service levels based on IGSLs, the first processing including:

specifying a plurality of IGSLs for the plurality of initiator groups, wherein each of the plurality of IGSLs identifies a target I/O response time range for one of the plurality of initiator groups; and for each of the plurality of initiator groups having an associated one of the plurality of IGSLs, performing second processing that creates a hierarchy including three levels of nodes, said each initiator group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of storage groups, wherein a path from the root node to a second node in the third level denotes one of the plurality of triples having an associated service level and an associated target I/O response time range corresponding to the second node in the third level.

3. The method of claim 2, wherein said second processing includes:

partitioning the target I/O response time range of the associated one of the plurality of IGSLs for said each initiator group into a plurality of subranges;

specifying a plurality of port group service levels (PGSLs) for the plurality of port groups, wherein each of the plurality of subranges is assigned to a different one of the PGSLs for one of the plurality of port groups represented by one of the nodes of the second level of the hierarchy;

for each of the plurality of port groups having an associated one of the plurality of PGSLs, partitioning one of the plurality of subranges that is assigned to the associated one of the plurality of PGSLs into a second plurality of subranges; and specifying a plurality of storage group service levels (SGSLs) for the plurality of storage groups, wherein each of the second plurality of subranges is assigned to a different one of the SGSLs for one of the plurality of storage groups represented by one node of the third level in the hierarchy.

4. The method of claim 3, wherein the subranges of the plurality do not overlap one another.

5. The method of claim 3, wherein each of the plurality of subranges is a same size.

6. The method of claim 3, wherein the subranges of the second plurality do not overlap one another.

7. The method of claim 3, wherein each of the second plurality of subranges is a same size.

8. The method of claim 1, wherein each of the plurality of triples represents a path or connection between an initiator port of the one initiator group and a target port of the one port group, and wherein one or more storage objects of the one storage group are accessible for I/O operations over the path or connection.

9. The method of claim 1, wherein the plurality of initiator groups includes a plurality of initiator ports of a plurality of hosts.

10. A method of determining service levels comprising:

receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:

determining a first triple of the plurality of triples that matches the first storage group, the first initiator group and the first port group, wherein the first triple is associated with the first service level, and wherein the method further comprises:

determining to assign service levels to I/O operations based on storage group service levels (SGSLs); and responsive to determining to assign service levels based on the SGSLs, performing first processing that creates the table of the plurality of service levels based on SGSLs, the first processing including:

specifying a plurality of SGSLs for the plurality of storage groups, wherein each of the plurality of SGSLs identifies a target I/O response time range for one of the plurality of storage groups; and for each of the plurality of storage groups having an associated one of the plurality of SGSLs, performing second processing that creates a hierarchy including three levels of nodes, said each storage group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of initiator groups, wherein a path from the root node to a second node in the third level denotes one of the plurality of triples having an associated service level and an associated target I/O response time range corresponding to the second node in the third level.

11. The method of claim 10, wherein said second processing includes:

partitioning the target I/O response time range of the associated one of the plurality of SGSLs for said each storage group into a plurality of subranges;

specifying a plurality of port group service levels (PGSLs) for the plurality of port groups, wherein each of the plurality of subranges is assigned to a different one of the PGSLs for one of the plurality of port groups represented by one of the nodes of the second level of the hierarchy;

for each of the plurality of port groups having an associated one of the plurality of PGSLs, partitioning one of the plurality of subranges that is assigned to the associated one of the plurality of PGSLs into a second plurality of subranges; and specifying a plurality of initiator group service levels (IGSLs) for the plurality of initiator groups, wherein each of the second plurality of subranges is assigned to a different one of the IGSLs for one of the plurality of initiator groups represented by a node of the third level in the hierarchy.

12. The method of claim 11, wherein the subranges of the plurality do not overlap one another.

13. The method of claim 11, wherein each of the plurality of subranges is a same size.

14. The method of claim 11, wherein the subranges of the second plurality do not overlap one another.

15. The method of claim 11, wherein each of the second plurality of subranges is a same size.

16. The method of claim 2, wherein the target I/O response time ranges of the IGSLs form a contiguous non-overlapping I/O response time range.

17. The method of claim 1, further comprising:

receiving an input that indicates whether to assign service levels to I/O operations based on initiator group service levels (IGSLs) or based on storage group service levels (SGSLs);

responsive to the input indicating to assign service levels to I/O operations based on IGSLs, using a first table as the table for assigning service levels to I/O operations, wherein the first table is generated using a top down approach in which IGSLs are specified and used to determine port group service levels (PGSLs) for the plurality of port groups within each of the IGSLs, and wherein each of the PGSLs for one of the plurality of port groups is used to determine SGSLs for the plurality of storage groups within each of the PGSLs, and wherein each of the SGSLs denotes one of the plurality of service levels associated with one of the plurality of triples; and responsive to the input indicating to assign service levels to I/O operations based on SGSLs, using a second table as the table for assigning service levels to I/O operations, wherein the second table is generated using a bottom up approach in which SGSLs are specified and used to determine PGSLs for the plurality of port groups within each of the SGSLs, and wherein each of the PGSLs for one of the plurality of port groups is used to determine IGSLs for the plurality of initiator groups within each of the PGSLs, and wherein each of the IGSLs denotes one of the plurality of service levels associated with one of the plurality of triples.

18. A system comprising:
one or more processors; and
one or more memories comprising code stored thereon that, when executed, performs a method of determining service levels comprising:
receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and responsive to the first target port of the data storage system receiving the I/O operation, the data storage system assigning the I/O operation a first service level using a table of a plurality service levels for a plurality of triples, wherein each of the plurality of service levels is associated with one of the plurality of triples and denotes a target level of I/O response time performance for said one triple, wherein each of the plurality of triples identifies one of the plurality of initiator groups, one of the plurality of storage groups and one of the plurality of port groups, wherein the first service level denotes a target I/O response time for servicing the I/O operation, wherein said assigning includes:

determining a first triple of the plurality of triples that matches the first storage group, the first initiator group and the first port group, wherein the first triple is associated with the first service level.

19. A non-transitory computer readable medium comprising code stored thereon that, when executed, performs a method of determining service levels comprising:

receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and responsive to the first target port of the data storage system receiving the I/O operation, the data storage system assigning the I/O operation a first service level using a table of a plurality service levels for a plurality of triples, wherein each of the plurality of service levels is associated with one of the plurality of triples and denotes a target level of I/O response time performance for said one triple, wherein each of the plurality of triples identifies one of the plurality of initiator groups, one of the plurality of storage groups and one of the plurality of port groups, wherein the first service level denotes a target I/O response time for servicing the I/O operation, wherein said assigning includes:

determining a first triple of the plurality of triples that matches the first storage group, the first initiator group and the first port group, wherein the first triple is associated with the first service level.

20. A non-transitory computer readable medium comprising code stored thereon that, when executed, performs a method of determining service levels comprising:

receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:
  determining a first triple of the plurality of triples that matches the first storage group, the first initiator group and the first port group, wherein the first triple is associated with the first service level; and wherein the method further includes:
determining that service levels are assigned to I/O operations based on initiator group service levels (IGSLs); and
responsive to determining that service levels are assigned to I/O operations based on the IGSLs, performing first processing that creates the table of the plurality of service levels based on IGSLs, the first processing including:
  specifying a plurality of IGSLs for the plurality of initiator groups, wherein each of the plurality of IGSLs identifies a target I/O response time range for one of the plurality of initiator groups; and
  for each of the plurality of initiator groups having an associated one of the plurality of IGSLs, performing second processing that creates a hierarchy including three levels of nodes, said each initiator group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of storage groups, wherein a path from the root node to a second node in the third level denotes one of the plurality of triples having an associated service level and an associated target I/O response time range corresponding to the second node in the third level.

21. A system comprising:
one or more processors; and
one or more memories comprising code stored thereon that, when executed, performs a method of determining service levels comprising:
  receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and
  assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:
    determining a first triple of the plurality of triples that matches the first storage group, the first initiator group and the first port group, wherein the first triple is associated with the first service level; and wherein the method further includes:
  determining that service levels are assigned to I/O operations based on initiator group service levels (IGSLs); and
  responsive to determining that service levels are assigned to I/O operations based on the IGSLs, performing first processing that creates the table of the plurality of service levels based on IGSLs, the first processing including:
    specifying a plurality of IGSLs for the plurality of initiator groups, wherein each of the plurality of IGSLs identifies a target I/O response time range for one of the plurality of initiator groups; and
    for each of the plurality of initiator groups having an associated one of the plurality of IGSLs, performing second processing that creates a hierarchy including three levels of nodes, said each initiator group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of storage groups, wherein a path from the root node to a second node in the third level denotes one of the plurality of triples having an associated service level and an associated target I/O response time range corresponding to the second node in the third level.

22. A non-transitory computer readable medium comprising code stored thereon that, when executed, performs a method of determining service levels comprising:
  receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and
  assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:
    determining a first triple of the plurality of triples that matches the first storage group, the first initiator group and the first port group, wherein the first triple is associated with the first service level, and wherein the method further comprises:
  determining to assign service levels to I/O operations based on storage group service levels (SGSLs); and
  responsive to determining to assign service levels based on the SGSLs, performing first processing that creates the table of the plurality of service levels based on SGSLs, the first processing including:
    specifying a plurality of SGSLs for the plurality of storage groups, wherein each of the plurality of SGSLs identifies a target I/O response time range for one of the plurality of storage groups; and for each of the plurality of storage groups having an associated one of the plurality of SGSLs, performing second processing that creates a hierarchy including three levels of nodes, said each storage group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of initiator groups, wherein a path from the root node to a second node in the third level denotes one of the plurality of triples having an associated service level and an associated target I/O response time range corresponding to the second node in the third level.

23. A system comprising:

one or more processors; and one or more memories comprising code stored thereon that, when executed, performs a method of determining service levels comprising:

receiving an I/O operation at a first target port of a data storage system, wherein the I/O operation is sent from a first initiator port of a host and wherein the I/O operation is directed to a first storage object in a first storage group of a plurality of storage groups, wherein the first initiator port is included in a first initiator group of a plurality of initiator groups, and wherein the first target port is included in a first port group of a plurality of port groups; and assigning the I/O operation a first service level using a table of a plurality service levels for a plurality of triples, wherein each of the plurality of service levels is associated with one of the plurality of triples, wherein each of the plurality of triples identifies one of the plurality of initiator groups, one of the plurality of storage groups and one of the plurality of port groups, wherein said assigning includes:

determining a first triple of the plurality of triples that matches the first storage group, the first initiator group and the first port group, wherein the first triple is associated with the first service level, and wherein the method further comprises:

determining to assign service levels to I/O operations based on storage group service levels (SGSLs); and responsive to determining to assign service levels based on the SGSLs, performing first processing that creates the table of the plurality of service levels based on SGSLs, the first processing including:

specifying a plurality of SGSLs for the plurality of storage groups, wherein each of the plurality of SGSLs identifies a target I/O response time range for one of the plurality of storage groups; and for each of the plurality of storage groups having an associated one of the plurality of SGSLs, performing second processing that creates a hierarchy including three levels of nodes, said each storage group is represented as a root node at a first level of the hierarchy, wherein the hierarchy includes a first plurality of nodes at a second level of the hierarchy that are children of the root node, wherein each node in the second level represents one of the plurality of port groups, wherein each node in the second level that represents one of the plurality of port groups has a plurality of child nodes included in a third level of the hierarchy, wherein each node in the third level represents one of the plurality of initiator groups, wherein a path from the root node to a second node in the third level denotes one of the plurality of triples having an associated service level and an associated target I/O response time range corresponding to the second node in the third level.

* * * * *